(12) United States Patent
Zheng et al.

(10) Patent No.: US 10,620,627 B2
(45) Date of Patent: *Apr. 14, 2020

(54) METHOD AND SYSTEM FOR RISK CONTROL IN SWITCHING DRIVING MODE

(71) Applicant: PLUSAI CORP, Los Altos, CA (US)

(72) Inventors: Hao Zheng, Saratoga, CA (US); Timothy Patrick Daly, Jr., San Jose, CA (US); David Wanqian Liu, Los Altos, CA (US)

(73) Assignee: PLUSAI CORP, Los Altos, CA (US)

( * ) Notice: Subject to any disclaimer, the term of this patent is extended or adjusted under 35 U.S.C. 154(b) by 87 days.

This patent is subject to a terminal disclaimer.

(21) Appl. No.: 15/846,851

(22) Filed: Dec. 19, 2017

(65) Prior Publication Data

US 2019/0187700 A1 Jun. 20, 2019

(51) Int. Cl.
| | |
|---|---|
| *G05D 1/00* | (2006.01) |
| *G06F 9/48* | (2006.01) |
| *B60W 40/08* | (2012.01) |
| *B60W 50/08* | (2020.01) |
| *B60W 50/14* | (2020.01) |

(52) U.S. Cl.
CPC .......... *G05D 1/0061* (2013.01); *B60W 40/08* (2013.01); *B60W 50/082* (2013.01); *B60W 50/14* (2013.01); *G06F 9/4881* (2013.01); *B60W 2040/0872* (2013.01); *B60W 2540/22* (2013.01)

(58) Field of Classification Search
CPC .. G05D 1/0061; B60W 40/08; B60W 50/082; B60W 50/14; B60W 2040/0872; B60W 2540/22; G06F 9/4881
See application file for complete search history.

(56) References Cited

U.S. PATENT DOCUMENTS

| | | | | |
|---|---|---|---|---|
| 2008/0312830 | A1 | 12/2008 | Liu et al. | |
| 2014/0350789 | A1* | 11/2014 | Anker | B62D 15/025 701/41 |
| 2017/0234689 | A1* | 8/2017 | Gibson | G01C 21/3492 701/25 |
| 2017/0247041 | A1* | 8/2017 | Kim | G05D 1/0061 |

(Continued)

OTHER PUBLICATIONS

International Search Report and Written Opinion dated Apr. 27, 2018 in International Application PCT/IB2018/050272.

(Continued)

*Primary Examiner* — Aaron L Troost
(74) *Attorney, Agent, or Firm* — Pillsbury Winthrop Shaw Pittman LLP

(57) ABSTRACT

The present teaching relates to method, system, and medium, for switching a mode of a vehicle. Real-time data related to the vehicle and a state of a driver are received and used to determine a set of tasks to be performed to switch the vehicle from a current mode to a different mode based on a task model. A first duration of time required to switch is determined based on a first risk associated with the current mode. A task duration time needed to complete each task is estimated. A second risk associated with the switching is determined based on the first duration as required and a total duration of time determined based on the task duration time needed to complete the set of tasks. The vehicle mode is switched if the second risk satisfying a criterion.

20 Claims, 26 Drawing Sheets

(56) References Cited

U.S. PATENT DOCUMENTS

2019/0187701 A1\* 6/2019 Zheng .................. G05D 1/0061

OTHER PUBLICATIONS

International Search Report and Written Opinion dated Apr. 5, 2018 in International Application PCT/IB2018/058174.
Office Action dated Jul. 23, 2019 in U.S. Appl. No. 15/872,245.
Notice of Allowance dated Nov. 8, 2019 in U.S. Appl. No. 15/872,245.

\* cited by examiner

| Mode | Name | Description |
|---|---|---|
| Human Driver Monitors Driving Environment | | |
| Level 0 | No Automation | Full-time performance by the human driver of all aspects of the dynamic driving task, even when *enhanced by warning or intervention systems* |
| Level 1 | Driver Assistance | Driving mode-specific execution by a driver assistance system of *either steering or acceleration/deceleration* using information about the driving environment and with the expectation that the human driver perform all remaining aspects of the dynamic driving task |
| Level 2 | Partial Automation | Driving mode-specific execution by one or more driver assistance systems of *both steering and acceleration/deceleration* using information about the driving environment and with the expectation that the human driver perform all remaining aspects of the dynamic driving task |
| Automated Driving System Monitors Driving Environment | | |
| Level 3 | Conditional Automation | Driving mode-specific performance by an automated driving system of all aspects of the dynamic driving task with the expectation that the *human driver will respond appropriately to a request to intervene* |
| Level 4 | High Automation | Driving mode-specific performance by an automated driving system of all aspects of the dynamic driving task, *even if a human driver does not respond appropriately to a request to intervene* |
| Level 5 | Full Automation | Full-time performance by an automated driving system of all aspects of the dynamic driving task *under all roadway and environmental conditions that can be managed by a human driver* |

Fig. 17B

METHOD AND SYSTEM FOR RISK CONTROL IN SWITCHING DRIVING MODE

BACKGROUND

1. Technical Field

The present teaching generally relates to the field of autonomous and hybrid vehicles. More specifically, the present teaching relates to mechanisms of operating a vehicle, and an augmented behavior planning interface thereof.

2. Technical Background

Autonomous vehicles employ various computing means to aid automated vehicle operation. Recently, in the automotive industry, much of the focus is on making a vehicle operate in an autonomous mode in a safe manner. Autonomous driving vehicles allow a passenger (driver) to manually switch from a human driving mode (i.e., a mode when the operator fully exercises the controls of the vehicle) to an autonomous mode (i.e., a mode where the vehicle essentially drives itself). Vehicles capable of both modes of operation (autonomous and manual) are hybrid driving vehicles.

In the past, the switching between autonomous and manual driving modes is done manually. In operation, in some situations, switching itself may present danger if it is carried out in certain situations. Furthermore, even when an autonomous driving vehicle detects potential danger and decides to switch the control to a human driver, the manner by which the human driver is to take over the control in a manual mode may depend on the state of the passenger. For instance, while in an autonomous driving mode, the passenger may have been paying less attention or may even fall sleep. Those real issues in autonomous driving have not been addressed in the past.

Another aspect involves automatic switching in a vehicle of hybrid driving modes in the reverse direction, i.e., from a human driving mode to an autonomous driving mode. The traditional approaches do not address switching in this direction, let alone how to do it in a safe manner.

Therefore, there is a need for solutions to solve such problems.

SUMMARY

The teachings disclosed herein relate to methods, systems, and programming for augmented behavior planning in autonomous and hybrid vehicular driving environments. More particularly, the present teaching relates to methods, systems, and programming related to mechanisms of performing handover operations associated with different modes of operation of vehicles.

By one aspect of the present disclosure, there is disclosed a method implemented on a machine having at least one processor, storage, and a communication platform capable of connecting to a network for switching a vehicle from a current mode to a different mode. The method includes the steps of receiving real-time data related to the vehicle and a state of a driver in the vehicle, and determining, based on the real-time data, a set of tasks to be performed to switch the vehicle from the current mode to the different mode in accordance with a task model. The method further includes determining, based on a first risk associated with the current mode, a first duration of time required to switch from the current mode to the different mode and estimating, for each of the set of tasks, a task duration time needed to complete the task. The method estimates a second risk of switching from the current mode to the different mode based on the first duration of time as required and a total duration of time determined based on the task duration times needed to complete the set of tasks, and in response to the second risk satisfying a criterion, the method switches the vehicle from the current mode to the different mode.

By one aspect of the present disclosure, there is disclosed a system for switching a vehicle from a current mode to a different mode. The system comprises a switch task estimator configured to receive real-time data related to the vehicle and a state of a driver in the vehicle, and determine, based on the real-time data, a set of tasks to be performed to switch the vehicle from the current mode to the different mode in accordance with a task model. The system further comprises a response time estimator configured to determine, based on a first risk associated with the current mode, a first duration of time required to switch from the current mode to the different mode, and estimate, for each of the set of tasks, a task duration time needed to complete the task. The system further includes a switching risk estimator configured to estimate a second risk of switching from the current mode to the different mode based on the first duration of time as required and a total duration of time determined based on the task duration times needed to complete the set of tasks. The switching risk estimator switches, in response to the second risk satisfying a criterion, from the current mode of the vehicle to the different mode.

Other concepts relate to software for implementing the present teaching on developing a vehicular system. A software product, in accordance with this concept, includes at least one machine-readable non-transitory medium and information carried by the medium. The information carried by the medium may be executable program code data, parameters in association with the executable program code, and/or information related to a user, a request, content, or information related to a social group, etc.

In one example, there is disclosed a machine readable medium having information stored thereon for switching a vehicle from a current mode to a different mode, wherein the information, when read by the machine, causes the machine to perform the following steps: receiving real-time data related to the vehicle and a state of a driver in the vehicle, and determining, based on the real-time data, a set of tasks to be performed to switch the vehicle from the current mode to the different mode in accordance with a task model. The steps further include determining, based on a first risk associated with the current mode, a first duration of time required to switch from the current mode to the different mode, estimating, for each of the set of tasks, a task duration time needed to complete the task. Further, the steps also include estimating a second risk of switching from the current mode to the different mode based on the first duration of time as required and a total duration of time determined based on the task duration times needed to complete the set of tasks, and switching, in response to the second risk satisfying a criterion, the vehicle from the current mode to the different mode.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 17B illustrates an exemplary table outlining various modes of operation of the vehicle, according to an embodiment of the present teaching;

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

An autonomous vehicle is one that is capable of sensing its environment and navigating through the environment without human input. Autonomous cars use a variety of techniques to detect their surroundings, such as radar, laser light, GPS, odometer and computer vision. Advanced control systems interpret sensory information to identify appropriate navigation paths, as well as obstacles and relevant signage. Autonomous cars include control systems that are capable of analyzing sensory data to distinguish between different cars on the road. The potential benefits of autonomous vehicles include reduced mobility and infrastructure costs, increased safety, increased mobility, increased customer satisfaction and reduced crime. Specifically, a significant reduction in traffic collisions and related costs is incurred by autonomous vehicles, including less need for insurance. Autonomous vehicles are predicted to increase traffic flow, relieve travelers from driving and navigation chores, and lower fuel consumption.

However, there are certain obstacles in the widespread adoption of autonomous vehicles. For instance, disputes concerning liability, time period needed to replace the existing stock of vehicles, resistance by individuals to forfeit control, consumer safety concerns, implementation of a workable legal framework and establishment of government regulations, risk of loss of privacy and security concerns are some factors that impede the adoption of autonomous vehicles. As such, there is described below a framework for a vehicular system that employs both an autonomous mode of operation, as well as a human-driver mode of operation. Note that in the present disclosure, the terms 'autonomous mode' and 'auto mode' are used interchangeably to correspond to an automatic operation of the vehicle, while the terms 'human-driver mode' and 'manual mode' are used interchangeably to correspond to operating the vehicle by a human driver.

Figure 1:
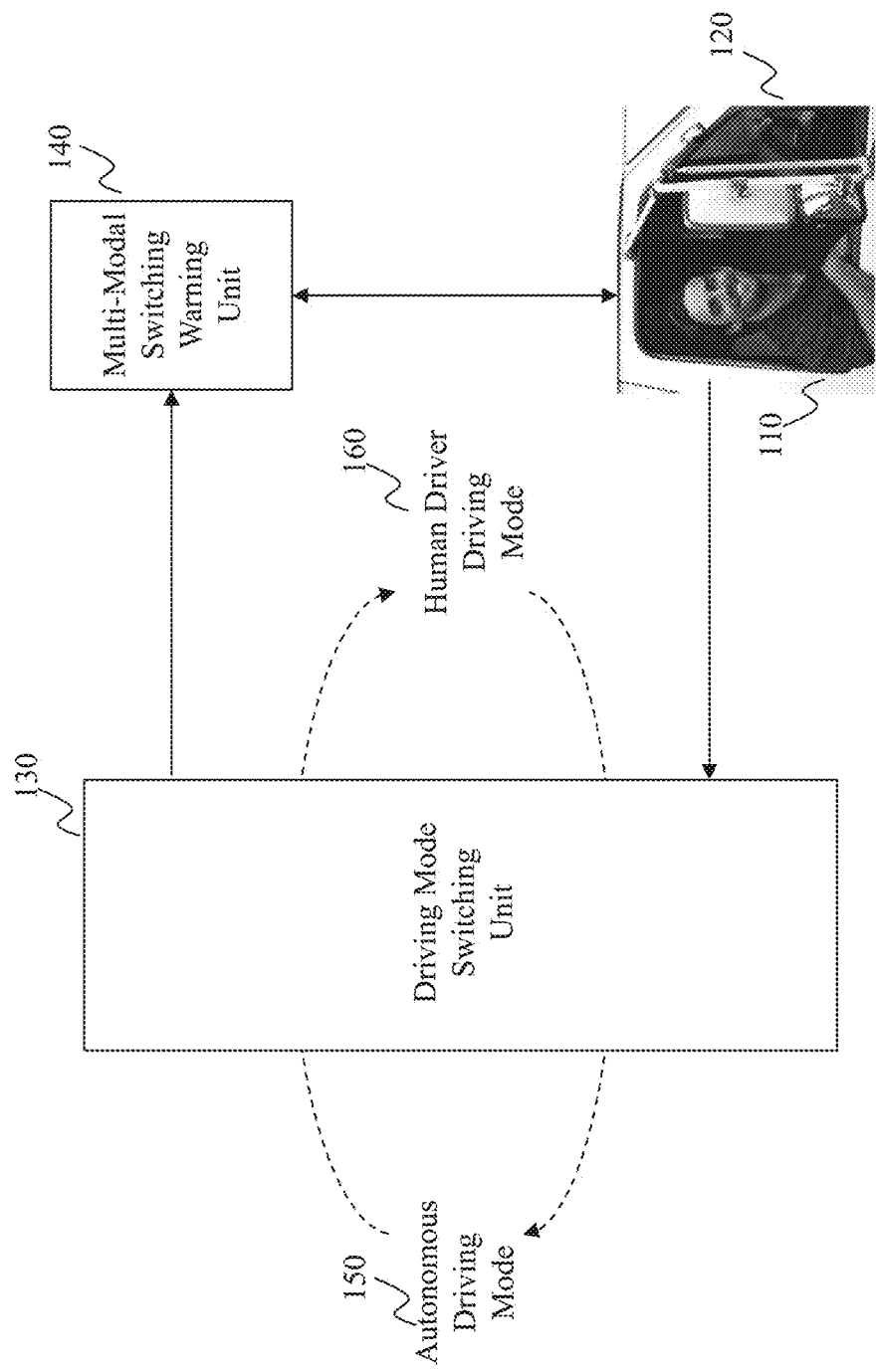
FIG. 1 depicts an exemplary diagram illustrating switching of operating modes in a vehicle, according to an embodiment of the present teaching.

FIG. 1 depicts an exemplary diagram illustrating switching of operating modes in a vehicle, according to an embodiment of the present teaching. As shown in FIG. 1, the vehicle includes a driving mode switching unit 130 and a multi-modal switching warning unit 140. The vehicle can operate in an autonomous mode 150 or a human-driver mode 160. The driving mode switching unit 130 is configured to switch the mode of operation of the vehicle between the autonomous mode 150 and a human-driver mode 160, respectively.

By one embodiment, the driving mode switching unit 130 initially determines a current mode in which the vehicle is operating. Upon determining the current mode of operation, the driving mode switching unit 130 determines, based on certain criteria (described next with reference to FIG. 2), whether a transition to a different mode is required. For example, if the current mode of operation is determined to be the autonomous mode (or alternatively, the human-driver mode), the driving mode switching unit 130 determines, based on a criterion associated with operating the vehicle in the current mode, whether a transition to the human-driver mode (or alternatively, the autonomous mode) is required. Upon an affirmative determination to switch the current mode of operation, the driving mode switching unit 130 provides an instruction to a multi-modal switching warning unit 140 indicating the intent to perform a switch in the operating mode of the vehicle.

Upon receiving the instruction indicating the intent of performing the switch in the operating mode of the vehicle, the multi-modal switching warning unit 140, delivers warning signals (described later with reference to FIG. 21) to an operator (e.g., driver) of the vehicle. Moreover, the warning signals may include certain tasks that are to be performed by the driver of the vehicle in order to switch the operating mode of the vehicle in an efficient manner. As such, by one embodiment, the multi-modal switching warning unit 140 monitors the driver to determine whether the tasks are being performed in a timely manner. Specifically, the multi-modal switching warning unit 140 monitors each task that is assigned to the driver of the vehicle to ensure that the assigned task is being performed in a timely manner. The driving mode switching unit 130 receives a feedback signal indicating a status of each of the tasks assigned to the driver of vehicle. Based on a successful completion of each task, the driving mode switching unit 130 executes the switching of the operation mode of the vehicle. By one embodiment, if a certain task is not completed in a timely manner, the driving mode switching unit 130 receives a feedback signal indicating that an exception handling process is to be performed. Details regarding the operations of the multi modal switching warning unit 140, and the driving mode switching unit 130 are described in the remainder of the present disclosure.

Figure 2:
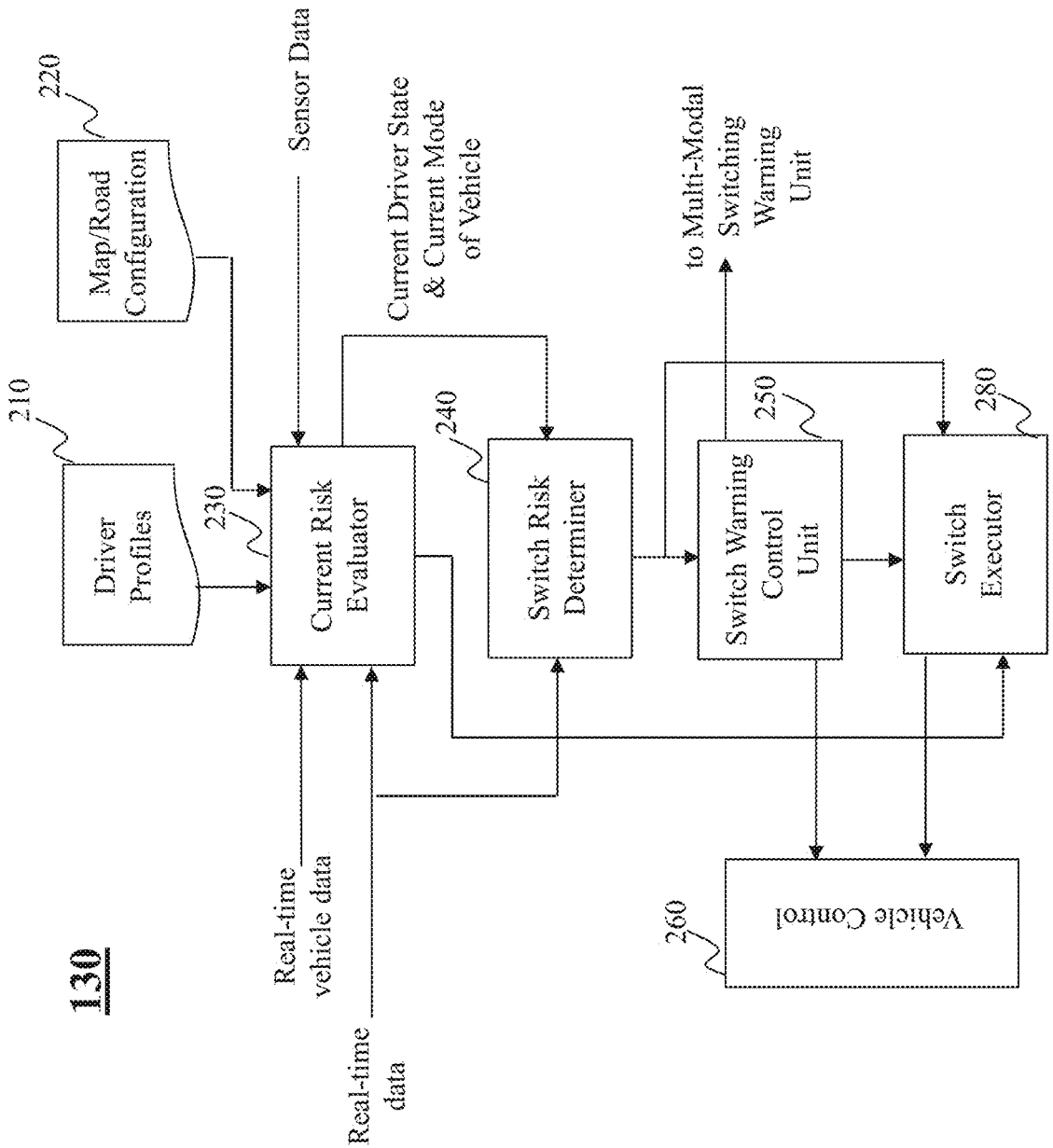
FIG. 2 depicts an exemplary block diagram of a driving mode switching unit of the vehicle, according to an embodiment of the present teaching.

FIG. 2 depicts an exemplary block diagram of the driving mode switching unit 130 of the vehicle, according to an embodiment of the present teaching. The driving mode switching unit 130 includes a current risk evaluator 230, a switch risk determiner 240, a switch warning control unit 250, a switch executor 280, a vehicle control system 260, a driver profile 210 and a map/road configuration model 220.

The current risk evaluator 230 is configured to determine a risk in operating the vehicle in a current mode of operation. By one embodiment, to determine the risk, the current risk evaluator 230 receives as input, real-time vehicle data, real-time intrinsic and extrinsic data, sensor data, the driver profile 210, and the map/road configuration data 220. The map/road configuration data 220 provides information pertaining to a geographical location where the vehicle is currently located. Additionally, the map/road configuration data 220 may include information corresponding to traffic in the geographical location of the vehicle. The driver profile 210 data includes information pertaining to a driving history of the driver. Such information may include, for instance, a number of violations the driver has been involved in a predetermined time-period, a model of the vehicle the driver is operating, characteristics of the driver such as, whether the driver is handicapped, whether the driver is short-sighted, whether the driver is required by law to wear devices (e.g., prescription glasses) which aid the driver in operating the vehicle, weather conditions in which driver is preferably recommended not to operate the vehicle, etc.

Figure 5:
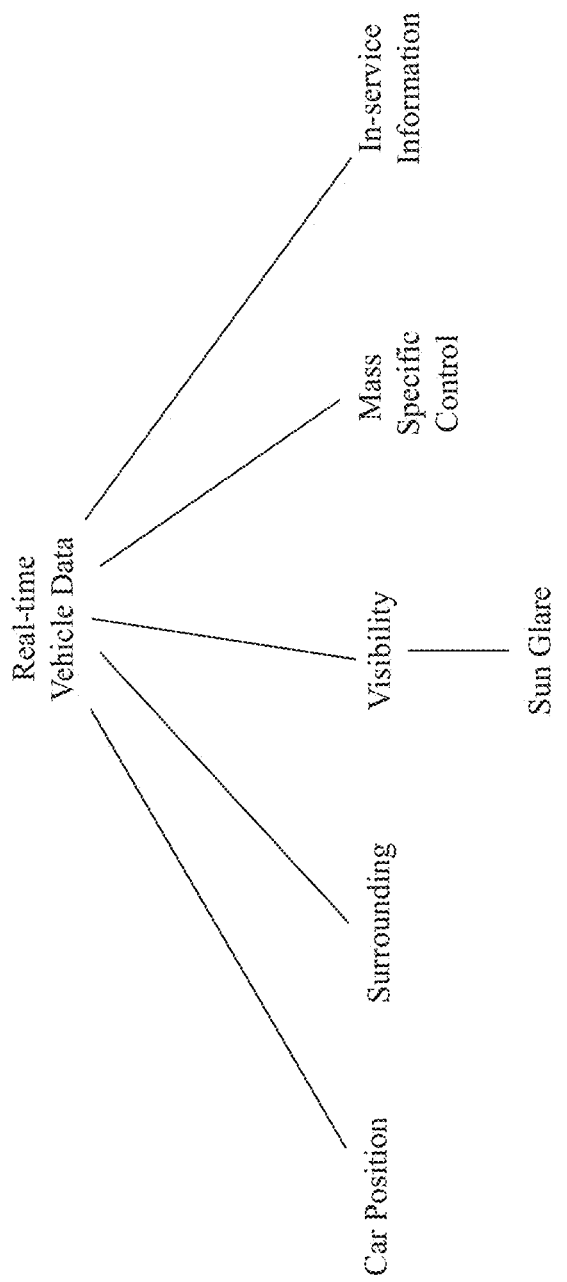
FIG. 5 illustrates a graph depicting information associated with real-time vehicle data in accordance with various embodiments of the present teaching.

Turning to FIG. 5, there is depicted an exemplary real-time vehicle data which is input to the current risk evaluator 230. Specifically, FIG. 5 depicts an illustrative graph depicting the information associated with real-time vehicle data in accordance with various embodiments of the present teaching. For instance, the real time vehicle data may include information pertaining to a current location of the vehicle (e.g., a latitude and longitude position), information regarding the surrounding of the vehicle, current visibility (e.g., amount of sun glare based on the current time) experienced by the driver of the vehicle, weight or mass specific control of the vehicle (e.g., current weight of passengers in the vehicle and other control parameters relevant to the operation of the vehicle), and information pertaining to servicing of the vehicle e.g., a current oil-level, condition of tires, brakes, wipers, and other important parameters that determine whether the vehicle can be operated in a safe fashion.

Figure 4:
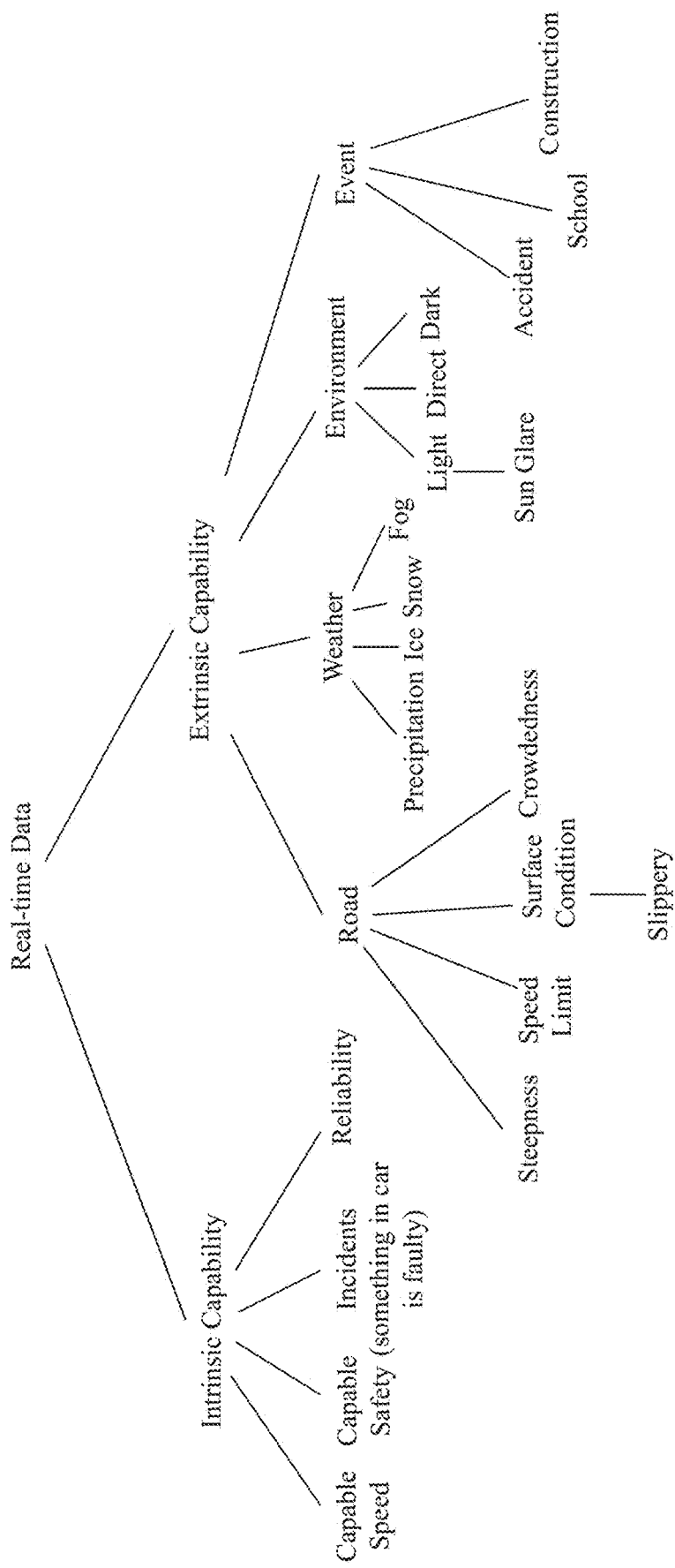
FIG. 4 illustrates a graph depicting information associated with real-time intrinsic and extrinsic data in accordance with various embodiments of the present teaching.

The current risk evaluator 230 also receives real time data (extrinsic and intrinsic capabilities of the vehicle) that is utilized in determining the risk of the current mode of operation of the vehicle. Turning to FIG. 4, there is depicted an illustrative graph depicting the information associated with real-time intrinsic and extrinsic data in accordance with various embodiments of the present teaching. As shown in FIG. 4, data related to intrinsic capabilities of the vehicle may include information pertaining to operating parameters of the vehicle such as capable speed, capable safety level of the vehicle, faults in the vehicle (e.g., low-levels of tire pressure, faulty brake pads, faulty head/tail lights etc.), and a reliability factor of the vehicle. The data related to extrinsic capabilities of the vehicle may include information external to the vehicle such as, a type and condition of the road the vehicle is traversing (e.g., a steepness/slope of the road, speed limits permitted on the road, current vehicular and human traffic on the road, and road surface conditions such as whether the road is slippery), weather information corresponding to the environment of the vehicle (e.g., ice, snow or amount of precipitation on the road the vehicle is traversing), a visibility in the environment of the vehicle, and external events such as whether there is an accident in the route of the vehicle, whether the vehicle is traversing in a restricted zone (e.g., a hospital or a school), or whether there is construction in the route of the vehicle that results in a detour of the initially planned route for the vehicle and the like.

Figure 6:
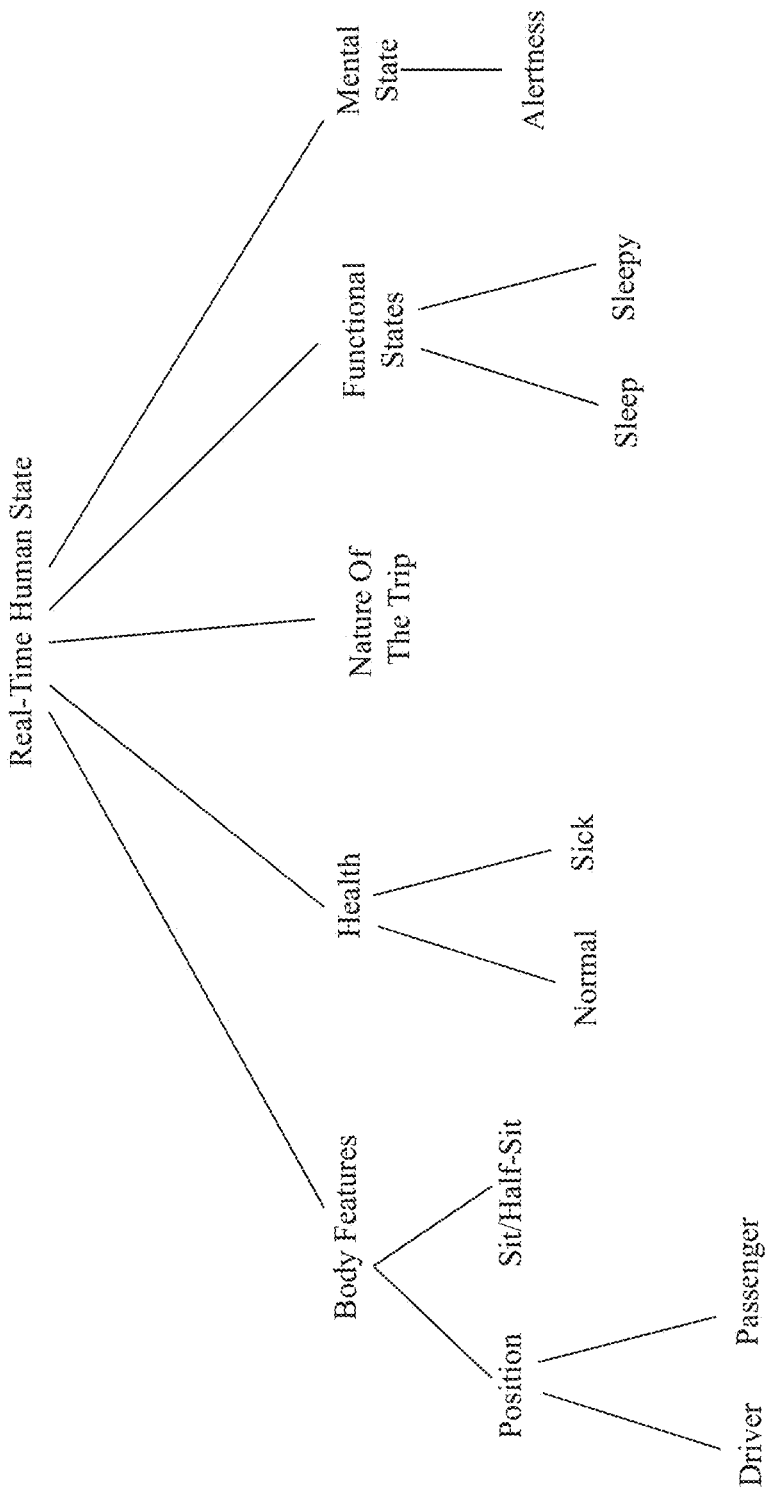
FIG. 6 illustrates a graph depicting information associated with real-time human state in accordance with various embodiments of the present teaching.

A further input to the current risk evaluator 230 is real-time sensor data that is utilized to determine a current state of the driver of the vehicle. Turning to FIG. 6, there is depicted an illustrative graph depicting information associated with the state of the driver of the vehicle in accordance with various embodiments of the present teaching. Such information may include data corresponding to a posture of the driver and/or passengers (e.g., detecting position, sitting posture, whether a seatbelt is worn by the driver, etc.), and a position of the driver and the passengers in the vehicle. Additional information associated with the driver state may include information pertaining to a health of the driver, a functional state of the driver (i.e., whether the driver is drowsy, sleeping or feeling sleepy, and whether the driver is intoxicated), a mental state of the driver (e.g. an alertness level of the driver), and information pertaining to a nature of trip made by the driver (e.g., if the driver and/or passenger is seriously wounded and the vehicle is on route to a hospital etc.). The sensor data utilized by the current risk evaluator 230 to detect the above described state(s) of the driver are described later with reference to FIG. 10.

Upon receiving the above described inputs, the risk evaluator 230 determines the risk involved in the current mode of operation of the vehicle. Specifically, the risk evaluator 230 determines whether it is safe to operate the vehicle in the current mode of operation. Details regarding the computation of such a risk are described later with reference to FIG. 7. Upon computing the risk, the current risk evaluator 230 determines whether the computed risk satisfies a certain criterion (e.g., is the computed risk above or below a predetermined first threshold risk level). The predetermined first threshold risk level associated with a particular mode of operation of the vehicle may correspond to a safety level of operating the vehicle in the particular mode of operation of the vehicle. Specifically, if the computed risk is above the first predetermined threshold risk level, it may be deemed that it is unsafe to operate the vehicle in the current mode, whereas if the computed risk is below the first predetermined threshold risk level, it may be deemed that the vehicle can continue to operate in the current mode. Based on the computed risk satisfying (or not satisfying) the criterion, the risk evaluator 230 may determine whether it is safe to operate the vehicle in the current mode of operation, or whether a switching of the current mode to a different mode of operating the vehicle is to be performed.

By one embodiment, if the computed risk associated with the current mode of operation is within permissible limits (e.g., the risk is below the first predetermined threshold risk level), the vehicle maintains the current mode of operation of the vehicle (i.e., no transition in the operation mode of the vehicle is to be executed). However, if the computed risk does not satisfy the criterion (e.g., the computed risk is above the first predetermined threshold risk level), the current risk evaluator 230 activates the switch risk determiner 240, to determine whether it is feasible to switch the operating mode of the vehicle to a different mode.

The switch risk determiner 240 receives the real-time intrinsic and extrinsic data, information pertaining to the current state of the driver, and the current mode in which the vehicle is operating. By one embodiment, the switch risk determiner 240 is configured to determine a risk associated with switching the vehicle to operate in the different mode of operation. For instance, if the vehicle is currently operating in the autonomous mode, the switch risk determiner 240 computes the risk of switching the vehicle to operate in the human-driven mode (i.e., a manual mode), and similarly if the vehicle is currently operating in the human-driven mode, the switch risk determiner 240 computes the risk of switching the vehicle to operate in the autonomous mode. The determination of the risk incurred in switching the mode of operation of the vehicle is computed based on several factors as described later with reference to FIG. 12.

By one embodiment, the current risk evaluator 240 determines the current risk associated with the current mode of operation of the vehicle. If the current risk is determined to be exceptionally high i.e., greater than a second predetermined threshold (substantially greater than the first predetermined threshold (e.g., the safety level)) associated with the current mode, the risk determiner 240 may not initiate the switch risk determiner to determine a risk associated with switching the mode of operation of the vehicle to the different mode.

Rather, the current risk evaluator 230 may execute an exception handling process e.g., to bring the vehicle to a stop in a safe manner. For example, consider that the current mode of operation of the vehicle is a human-driven mode. If the risk determiner 230 determines, for instance, that the driver of the vehicle is having a seizure or a life-threatening event (detected via a driver state analyzer included in the risk evaluator 230, and described later with reference to FIG. 7), then risk determiner 230 may not initiate the switch risk determiner 240 to determine a risk associated with switching the operating mode of vehicle. Instead, the current risk evaluator 230 may execute the exception handling process such as bringing the vehicle to an immediate halt, initiating a call for assistance to governmental authorities (e.g., automatically dialing 911 or calling for roadside assistance via a mobile phone associated with the vehicle), transmitting GPS location of the vehicle to a server that monitors the operations of the particular vehicle and other like vehicles. It must be appreciated that to perform the above stated functions of bringing the vehicle to a complete halt may include processing steps such as determining a current speed of the vehicle, a current lane in which the vehicle is traversing, neighboring traffic, identifying a shoulder region on the road (e.g., a pull-over zone), and gradually bringing the vehicle to a complete halt in a safe manner. As such, as shown in FIG. 2, the current risk evaluator 230 may bypass the switch risk determiner 240 and directly signal the switch executor 280 to instruct the vehicle control 260 of the imminent change in operation of the vehicle e.g., bringing the vehicle to a stop.

By one embodiment, if the current risk evaluator 230 determines that the current risk associated with the current mode of operation of the vehicle is above the first predetermined threshold associated with the current mode (safety level of the current mode), and below the second predetermined threshold level associated with the current mode, the current risk evaluator activates the switch risk determiner 240 to determine a risk associated with switching the vehicle to a different mode. If the switch risk determiner 240 determines that the risk associated with switching the operating mode of the vehicle to the different mode is feasible i.e., the switch risk determiner 240 determines that the vehicle can operate in the different mode in an efficient manner, the switch risk determiner 240 controls the switch warning control unit 250 to transmit a signal to the multi-modal switch warning unit 140, which provides instructions (e.g., via visual and audio means, that are described later with reference to FIG. 19) to the driver to perform a certain set of tasks such that the vehicle can transition to the different mode in an effective manner. Specifically, the multi-modal switch warning unit 140 provides an indication to the driver that the current mode of operation of the vehicle is at risk, as thus a switch to a different mode of operation of the vehicle will occur imminently based on the driver performing the set of assigned tasks. Details regarding the operations involved in switching the operating mode of the vehicle to the different mode are described later with reference to FIG. 19.

In contrast, if the switch risk determiner 240 determines that the risk associated with switching the vehicle to the different mode is high, the switch risk determiner 240 may control the switch executor 280 to instruct the vehicle control system 260 to implement an exception handling process as stated previously.

Figure 3:
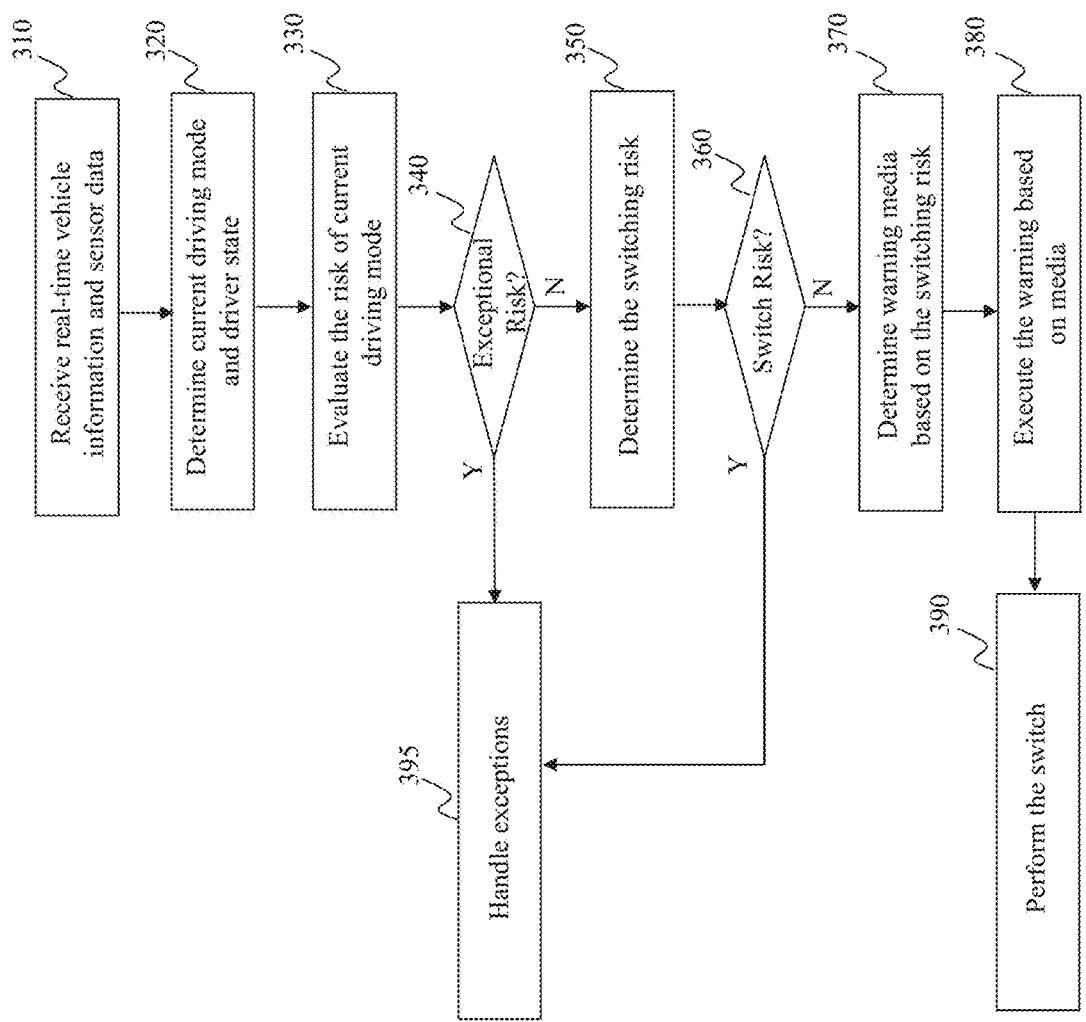
FIG. 3 depicts an illustrative flowchart of an exemplary process performed by the driving mode switching unit of the vehicle, according to an embodiment of the present teaching.

FIG. 3 depicts an illustrative flowchart of an exemplary process performed by the driving mode switching unit 130 of the vehicle, according to an embodiment of the present teaching. The process commences in step 310, wherein the driving mode switching unit 130 receives real-time information (i.e., real-time vehicle data, real-time intrinsic and extrinsic data), and sensor data.

Further, in step 320 the process determines the current driving mode of the vehicle and a current state of the driver operating the vehicle based on the received information in step 310. Details regarding the detection of the current state of the driver operating the vehicle are described later with reference to FIG. 10, whereas the details regarding the determination of the current mode of operation of the vehicle are described later with reference to FIG. 7.

Further in step 330, the process evaluates a risk associated with the current mode of operation of the vehicle. Thereafter, in step 340, the process performs a query to determine if the evaluated risk of operating the vehicle in the current mode is exceptionally high. For example, as stated previously, the process determines whether the evaluated risk is above the second predetermined threshold associated with the current mode of operation of the vehicle. If the response to the query is affirmative, the process moves to step 395, wherein the exceptional handling process as stated previously is executed. However, if the response to the query is negative, the process moves to step 350.

In step 350, the process determines a switching risk i.e., risk associated with transitioning the vehicle to a different mode of operation of the vehicle. By one embodiment, and as described later with reference to FIG. 12, the switching risk may be computed the driver based on the driver of the vehicle executing at least one task within an estimated time to perform the at least one task, wherein the estimated time is determined based on the state of the driver. Moreover, it must be appreciated that while switching from the current mode to a different mode of operating the vehicle, the risk in the different mode of operation of the vehicle does not exceed a threshold level of risk associated with the different mode.

The process then moves to step 360, wherein a query is performed to determine whether the switching risk evaluated in step 350 is high. By one embodiment, the process may determine whether there is any switching risk associated with transitioning the vehicle to the different mode. If the response to the query in step 360 is affirmative, the process moves to step 395 and executes the exception handling process, else the process moves to step 370.

In step 370, the process selects at least one warning media from a plurality of warning media sources to alert the driver of the vehicle of the imminent switch in the operating mode of the vehicle. By one embodiment, the warning media is selected based on the evaluated switching risk of step 350. Additionally, by one aspect of the present disclosure, the warning media may be selected, based on the driver's state wherein the warning media alerts the driver to perform certain tasks (described later with reference to FIG. 21) in order to transition/switch the operating mode of the vehicle in an efficient manner.

In step 380, the process executes the warning based on the selected media, and thereafter in step 390, the driving mode switching unit 130 executes the switching of the operating mode of the vehicle.

Figure 7:
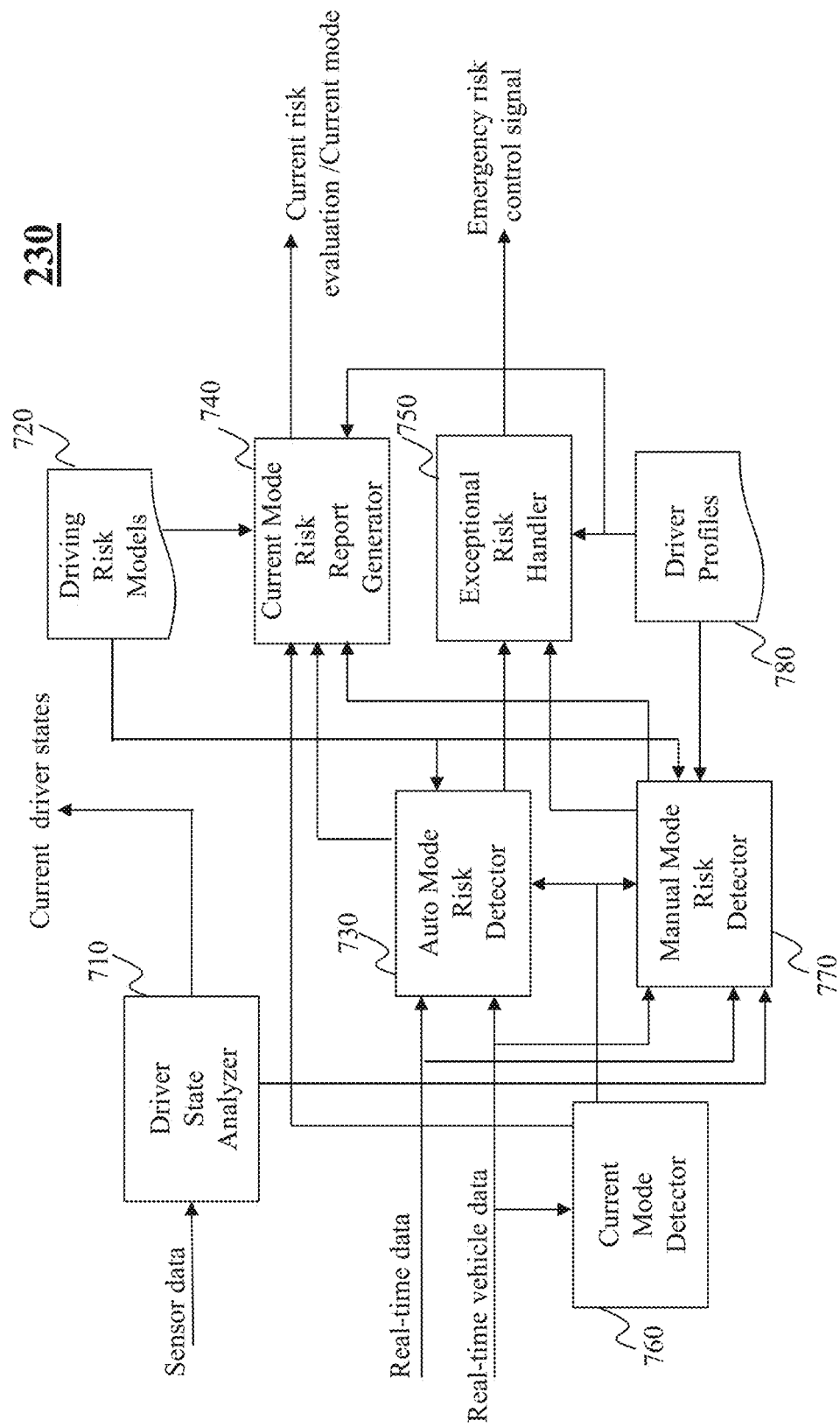
FIG. 7 depicts an exemplary block diagram of a risk evaluator included in the driving mode switching unit of the vehicle, according to an embodiment of the present teaching.
Figure 8:
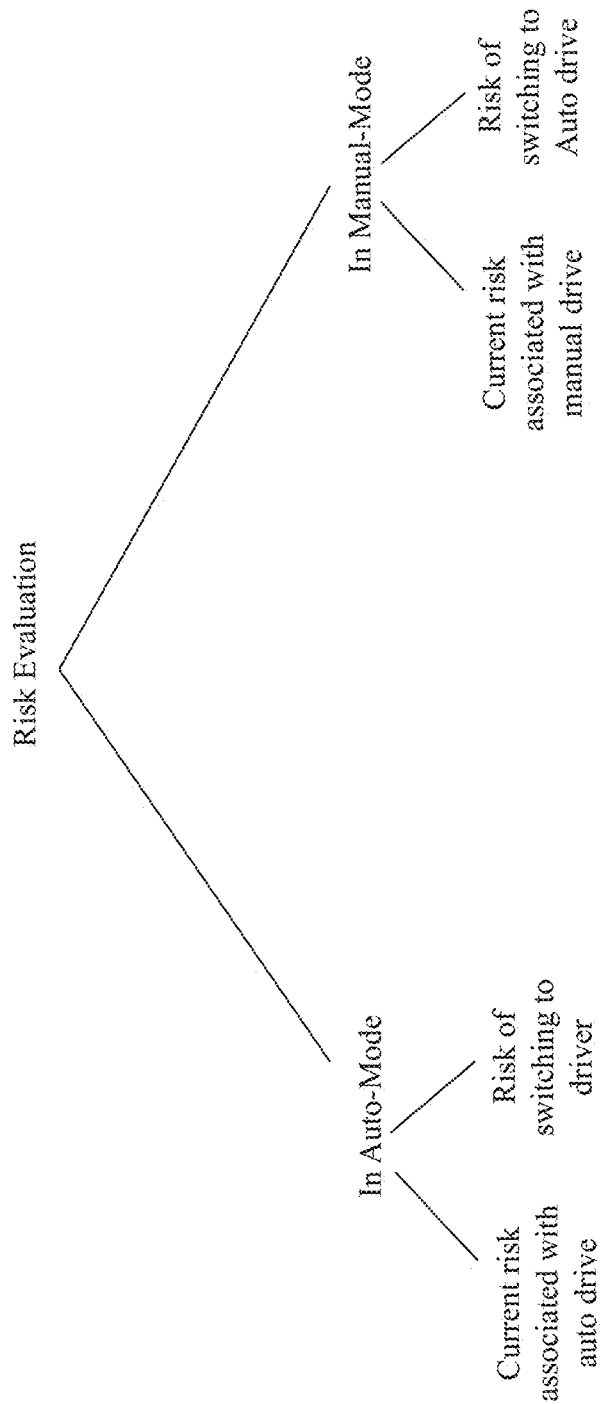
FIG. 8 illustrates an exemplary graph depicting types of risk evaluations, according to an embodiment of the present teaching.

Turning now to FIG. 7, there is depicted according to an embodiment, an exemplary block diagram of a risk evaluator 230 included in the driving mode switching unit 130 of the vehicle. As stated previously, the risk evaluator 230 is configured to determine a risk associated with a current mode in which the vehicle is operating. As shown in FIG. 8, by one embodiment of the present disclosure, the risk evaluation is performed in the autonomous mode of operation and the manual model of operation, respectively. Also associated with each mode of operation is a risk evaluation corresponding to a risk incurred in switching from the current mode of operation to a different mode. It must be appreciated that the number of modes in which the vehicle can operate is in no way limited to the two modes depicted in FIG. 8. Rather, the vehicle can operate in a plurality of modes as described later with reference to FIG. 17B.

The risk evaluator 230 as depicted in FIG. 7 includes a driver state analyzer 710, a driver risk model 720, a current mode detector 760, an auto mode risk detector 730, a manual mode risk detector 770, a current mode risk report generator 740, an exceptional risk handler 750, and driver profiles 780.

By one embodiment, the driver state analyzer 710 receives data from a plurality of sensors that are configured to capture information pertaining to various characteristics of the driver and/or passengers in the vehicle. For instance, the vehicular system may comprise a plurality of sensors including visual sensors, acoustic sensors, smell sensors, light sensors and the like that enable the risk evaluator 230 to determine a state of the driver. Details regarding the various sensors and the information captured by them to detect the state of the driver are described later with reference to FIG. 10.

The current mode detector 760 is configured to determine a current mode of operation of the vehicle. By one embodiment, real-time vehicle data described previously with reference to FIG. 5 can be used to determine the mode of operation of the vehicle. For example, sensors disposed within the vehicle may be configured to determine whether the driver is operating the vehicle by detecting for instance, if the steering wheel is being operated by the driver, the gas and/or brake pedals are being controlled by the driver and like. It must be appreciated that various mechanisms can be utilized to determine whether the vehicle is being operated in the human-driver or autonomous mode of operation.

Based on a determination of the current mode of operation of the vehicle, the current mode detector 760 activates either the auto mode risk detector 730 or the manual mode risk detector 770, to determine a risk associated with the respective mode of operation of the vehicle. The auto mode risk detector 730 receives as input, real-time data, and real-time vehicle data as described previously with reference to FIGS. 4 and 5. The manual mode risk detector 770 receives as input, the real-time data, and real-time vehicle data, the driver state, and the information included in the driver profile 780.

By one embodiment, the auto mode risk detector 730 may determine risk events based on environmental conditions. For example, in extreme foggy weather, the auto mode risk detector 730 may determine that it is unsafe for the vehicle to operate autonomously, for example, it may be difficult for the collision sensors of the vehicles to detect neighboring vehicles accurately. In a similar manner, when the vehicle is traversing on an icy road that is steep in nature, it may be feasible to operate the vehicle under human control i.e., the autonomous mode may not be appropriate to control the vehicle under harsh (icy) road conditions. Additionally, there may be certain geographical areas where autonomous driving is prohibited or is deemed unsafe such as acceleration lanes, exit lanes, toll booths, known construction zones, school zones and portions of roadway near such areas. The risk associated with such events is determined by the auto mode risk detector 730.

Similar to the scenario of hazardous autonomous driving cases as described above, by one embodiment, the manual mode risk detector 770 may determine situations where operating the vehicle under manual control may be hazardous. For example, the manual mode risk detector 770 may determine based on a detected state of the driver and driver profiles 780 that the driver is likely to meet with an accident in the imminent future. Such a determination may be based on a density of traffic disposed near the vehicle under consideration. As a further example, risk associated with the manual mode of operation of the vehicle may correspond to detecting a number of times (within a predetermined time-window), the vehicle diverts from its intended path. For example, sensors in the vehicle may detect that the vehicle is being operated by the driver in a manner such that the vehicle diverts from a lane center into adjacent lanes. Based on an amount of traffic disposed near the vehicle, the manual mode risk detector 770 may deem the occurrence of such an event as a risky event. Similarly, the driver state detector may determine that the driver is in a state of drowsiness, sleepy and/or yawning, and it may be risky to operate the vehicle in the human-driven mode.

The auto mode risk detector 730 as well as the manual mode risk detector 770 detect the respective risks associated in operating the vehicle in the autonomous mode or manual mode respectively, in accordance with a driving risk model 720. Specifically, based on the respective input information, the auto mode risk detector 730 as well as the manual mode risk detector 770 utilize the risk model 720 to evaluate the risk in operating the vehicle in the respective modes.

By one embodiment, the auto mode risk detector 730 and the manual mode risk detector 770 input the information pertaining to the driver and/or the above detected scenarios pertaining to the geographical location in which the vehicle is traversing to a risk report generator 740. The risk report generator 740 utilizes driving risk models 720 to generate a risk report associated with the auto mode or the manual mode of operation of the vehicle respectively, and outputs the current risk associated with the mode of operation of the vehicle.

Moreover, by one embodiment of the present disclosure, the auto mode risk detector 730 and the manual mode risk detector 770 provide inputs (indicating the respectively detected risks) to the exceptional risk handler 750. As will be described later with reference to FIG. 12, the vehicle system upon detecting a risk in the current mode of operation of the vehicle may, by one embodiment, determine the risk associated with switching the vehicle to different mode of operation. If the risk associated with the different mode of operation is within permissible limits, the vehicle system may execute an operation of switching the mode of operation of the vehicle.

However, if the risk associated with the different mode of operation of the vehicle is unacceptable, the current risk evaluator 230 may activate the exceptional risk handler 750, which based on the driver profile, may be configured to perform safety related functions as stated previously. For instance, the exceptional risk handler 750 may execute processes such as bringing the vehicle to an immediate halt, initiating a call for assistance to governmental authorities (e.g., automatically dialing 911 or calling for roadside assistance via a mobile phone associated with the vehicle), transmitting GPS location of the vehicle to a server that monitors the operations of the particular vehicle and other like vehicles. It must be appreciated that in order to perform the above stated functions of bringing the vehicle to a complete halt may include processing steps such as determining a current speed of the vehicle, a current lane in which the vehicle is traversing, neighboring traffic, identifying a shoulder region on the road (e.g., a pull-over zone), and gradually bringing the vehicle to a complete halt in a safe manner.

Figure 9:
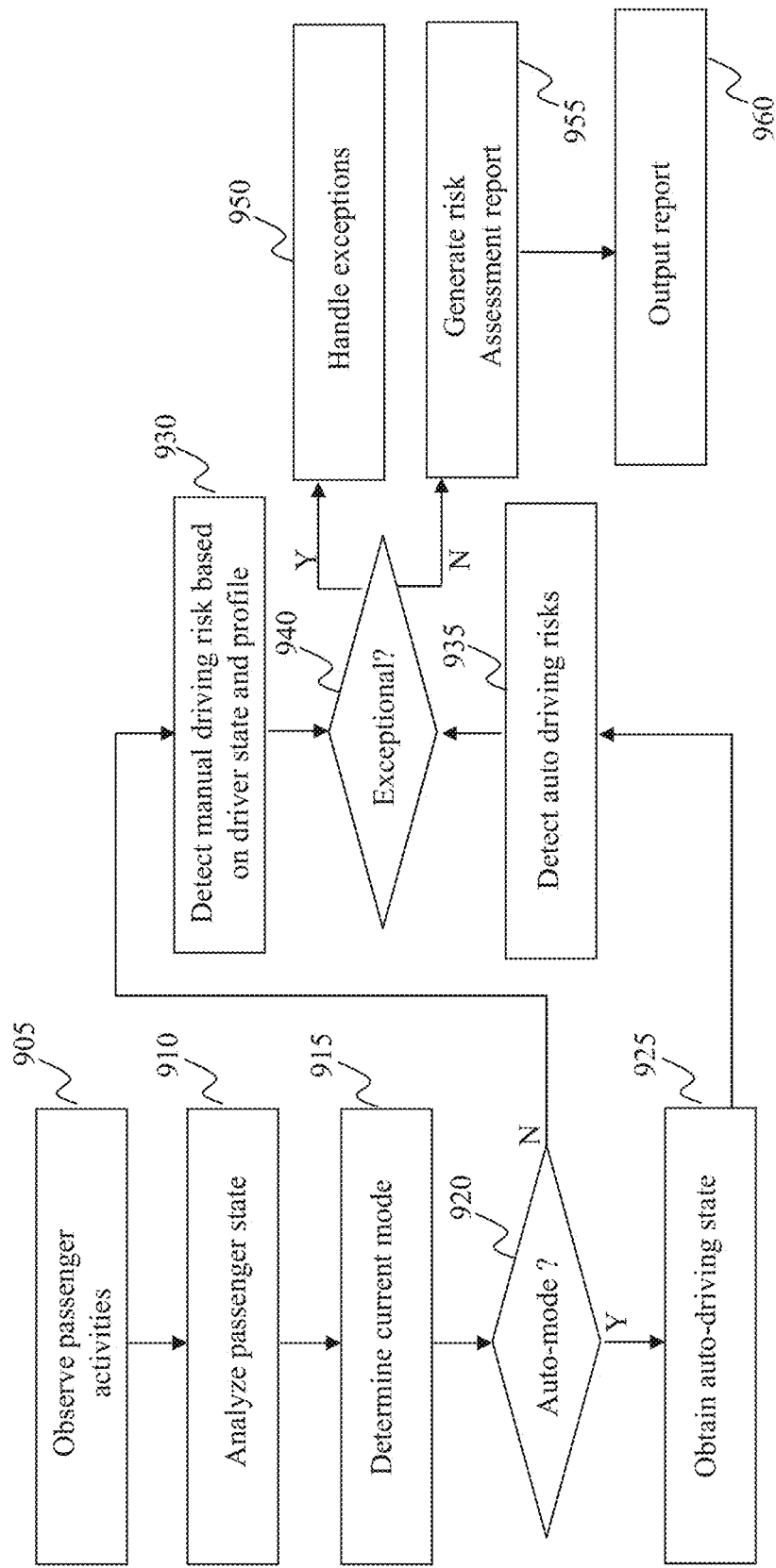
FIG. 9 depicts an illustrative flowchart outlining an exemplary process performed by the risk evaluator included in the driving mode switching unit of the vehicle, according to an embodiment of the present teaching.

FIG. 9 depicts an illustrative flowchart outlining an exemplary process performed by the risk evaluator 230, according to an embodiment of the present teaching. The process commences in step 905, wherein activities (described next with reference to FIG. 10) of a driver and/or passenger of the vehicle under consideration are detected via a plurality of sensors.

Based on the detected information by the sensors and a driver detection model (described next with reference to FIG. 10), the process in step 910 analyzes the driver/passenger state. In step 915, a current mode of operation of the vehicle is determined. For instance, the current mode detector 760 as shown in FIG. 7 can detect the current mode of operation of the vehicle.

The process further proceeds to step 920, wherein a query is performed to determine whether the vehicle is operating in an autonomous mode. If the response to the query is affirmative, the process moves to step 925, else if the vehicle is operating in the manual mode, the process moves to step 930.

In step 930, the process detects the risks associated with the vehicle operating in the manual mode. As described previously, the determination of such a risk may be based at least on a detected state of the driver, information included in the driver profile, and real-time information pertaining to the vehicle that the driver is operating. It must be appreciated that the information included in the driver profile is static driver information that corresponds to characteristics of the driver e.g., whether the driver is handicapped, short-sighted, medical information of the driver etc., whereas information related to the detected driver state is dynamic information based on a current behavior of the driver.

Returning to step 920, if it is determined that the vehicle is operating in the autonomous mode, the process moves to step 925 and obtains a state of operation of the vehicle in the autonomous mode. For instance, the process may determine a location of the vehicle, a current speed at which the vehicle is travelling, and the like information. By one embodiment, the process may be configured to determine a level of autonomous mode (described later with reference to FIG. 17B) in which the vehicle is being operated.

Upon determining the respective risks in operating the vehicle in the autonomous mode (step 935) or in the human-driven mode (step 930), the process moves to step 940. In step 940, a query is performed to determine whether exceptional handling is required i.e., the determined risks in the autonomous mode or in the human-driven mode of the vehicle is exceptionally high. If the response to the query is affirmative, the process moves to step 950, wherein the vehicle is operated in an exception handling mode and at least one of the previously described exception handling functions are performed.

However, if the response to the query in step 940 is negative, the process moves to step 955, wherein a risk assessment report is generated. Further, as shown in step 960, the generated risk assessment report may be displayed on the display panel included in the vehicle and/or be transmitted to a remote server for monitoring purposes.

Figure 10:
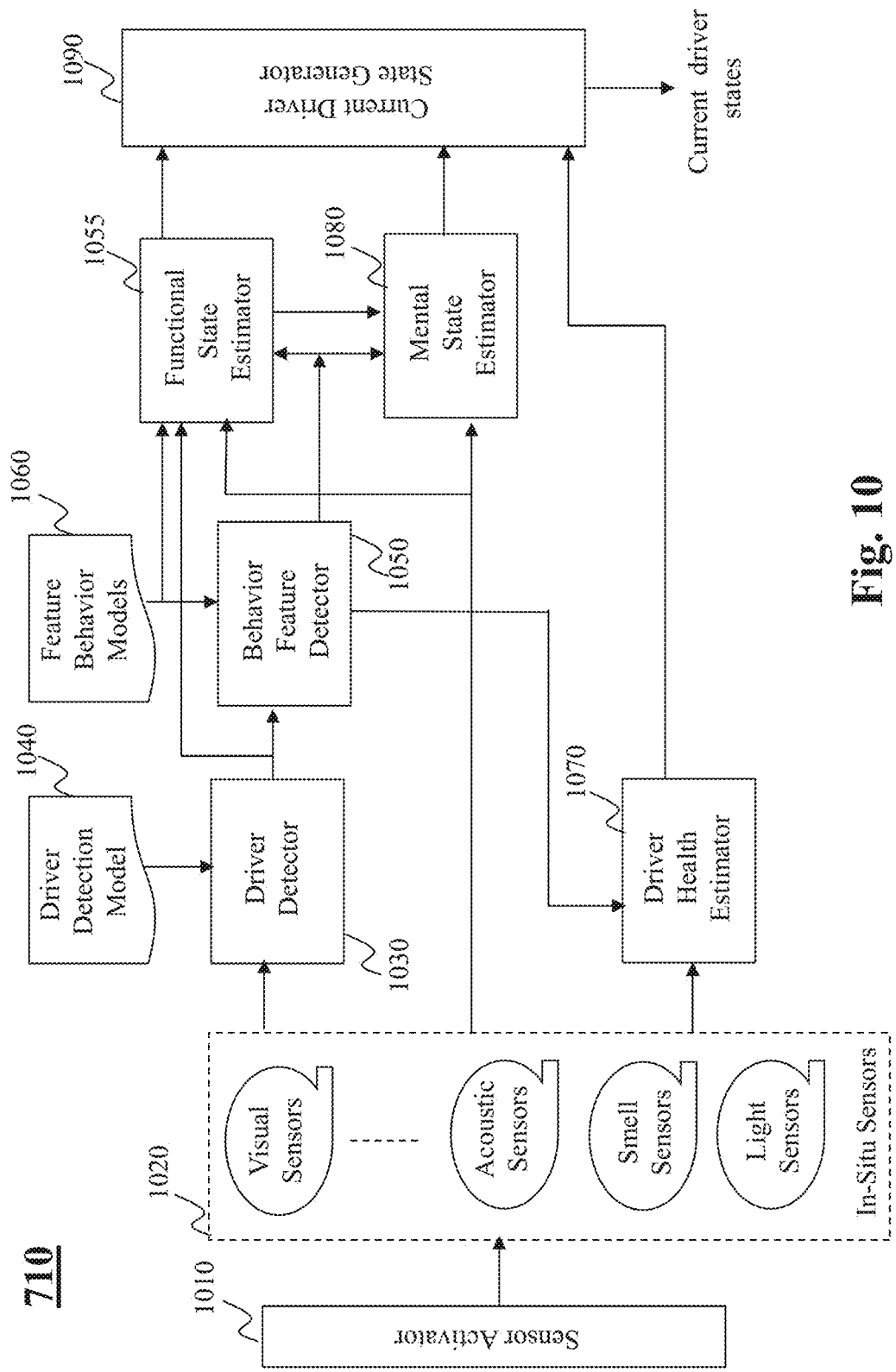
FIG. 10 depicts an exemplary block diagram of a driver state analyzer included in the risk evaluator, according to an embodiment of the present teaching.

FIG. 10 depicts an exemplary block diagram of a driver state analyzer 710, according to an embodiment of the present teaching. The driver state analyzer 710 includes a sensor activator 1010, a plurality of in-situ sensors 1020, a driver detector 1030, a driver detection model 1040, a behavior feature detector 1050, a feature behavior model 1060, a driver health estimator 1070, a functional state estimator 1055, a mental state estimator 1080, and a current user state generator 1090.

By one aspect of the present disclosure, the driver state analyzer 710 is configured to determine a state of the driver. Determining the state enables one to predict in an accurate manner, whether the driver is capable of performing activities related to maneuvering the vehicle such that any potential hazardous situations can be avoided.

By one embodiment, the sensor activator 1010 activates the in-situ sensors 1020 to detect the driver state. The in-situ sensors 1020 comprise a plurality of sensors including visual sensors, acoustic sensors, smell sensors, light sensors and the like that enable the detection of the state of the driver. For instance, the visual sensors included in the in-situ sensors 1020 may comprise a plurality of spatially distributed camera devices within the vehicle that are capable of processing and fusing images of a scene from a variety of viewpoints into some form more useful than the individual images. For example, the visual sensors may be configured to capture a pose of the driver (i.e., a posture/orientation of the driver in the driver seat). The pose information may be used to determine additional information such as a location of the driver's head with respect to a steering wheel, a direction in which the driver is looking (based on eye-tracking of the driver), etc. The information captured by the in-situ sensors 1020 is input into a driver detector unit 1030, which determines, for example, the driver's pose based on a driver detection model 1040.

Information detected by the driver detector unit 1030 e.g., the driver's pose may be input to a behavior feature detector 1050. The behavior feature detector 1050 may be configured to determine, based on a feature behavior model 1060, features associated with the detected pose of the driver. For instance, features such as whether the driver is sleeping, whether the driver is yawning, whether the driver feeling drowsy and/or vomiting and the like can be determined by the feature behavior detector 1050.

By one embodiment, the detected behavior of the driver is input to the driver health estimator 1070, which is configured to determine a health of the driver. By one embodiment, the in-situ sensors may include a plurality of sensors that are disposed on the driver of the vehicle e.g., wearable sensors and/or sensors included in a device (e.g., a watch) worn by the driver, which collect information pertaining to the health of the driver. Such sensors may include for instance, a heart rate sensor configured to determine a heart rate of the driver, a temperature sensor configured to detect a temperature of the surface of the skin of the driver and the like. Information pertaining to the health of the driver is input to the current user state generator 1090.

According to one embodiment of the present disclosure, information pertaining to the behavior of the driver may be input to a functional state estimator 1055 and a mental state estimator 1080. The functional state estimator 1055 also receives additional inputs from the feature behavior model 1060, the driver detector unit 1030, and the in-situ sensors 1020 to determine a functional state of the driver. For instance, the functional state estimator 1055 may be configured to determine based on a detected pose/orientation of the driver, whether the driver is capable of operating the vehicle in a safe manner i.e., is the driver functioning in an acceptable manner.

Based on the driver's functional state which is estimated by the functional state estimator 1055, the mental state estimator 1080 may be configured to determine whether a mental state of the driver is normal. Such information can be used to determine whether the driver is capable of maneuvering the vehicle. Mental state information may include information pertaining to whether the driver is experiencing a life-threatening event such as a seizure. It must be appreciated that information from the sensors such as medical sensors including a heart rate monitor and the like may be used by the mental state estimator 1080 to determine the mental state of the driver. Information pertaining to the driver that is estimated by the modules: health estimator 1070, the mental state estimator 1080, and the functional state estimator 1055 are input to the current user state generator 1090 that combines the estimated health related information to determine a current state of the user i.e., the driver's state information.

Figure 11:
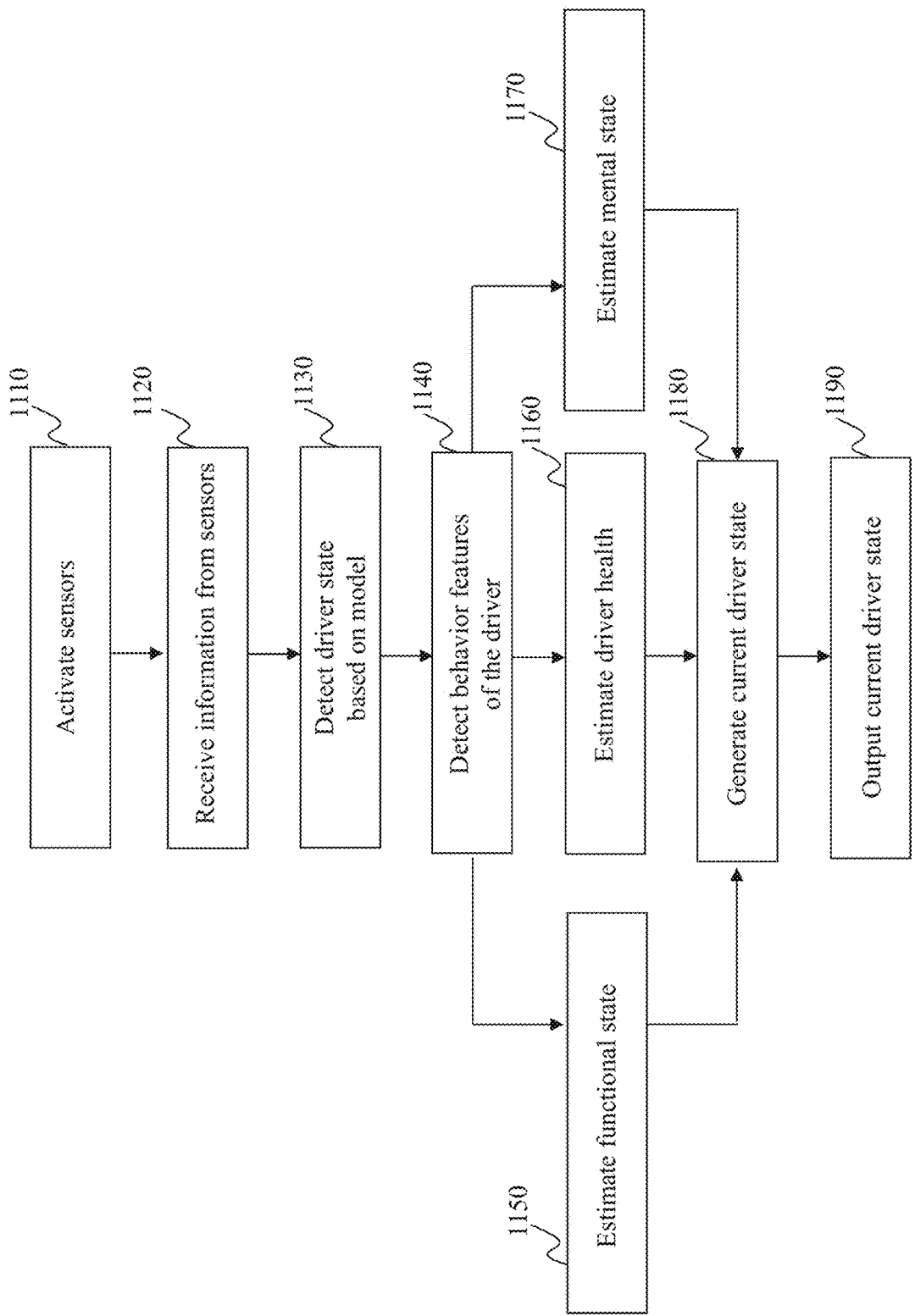
FIG. 11 depicts an illustrative flowchart outlining an exemplary process performed by the driver state analyzer included in the risk evaluator unit of the vehicle, according to an embodiment of the present teaching.

FIG. 11 depicts an illustrative flowchart outlining an exemplary process performed by the driver state analyzer 710, according to an embodiment of the present teaching. The process commences in step 1110, wherein the sensor activator (1010 in FIG. 10) activates the plurality of in-situ sensors in order to respectively capture information pertaining to the driver of the vehicle. In step 1120, the driver detector upon receiving information from the respective sensors, utilizes a driver detection model to detect the state of the driver (step 1130). Specifically, in step 1103, information related to the state of the driver of the vehicle such as a location of the driver within the vehicle, a pose of the driver etc. may be determined based on the driver detection model.

The process then proceeds to step 1140, wherein behavior features of the driver are detected. Specifically, in step 1140, based on the information detected in step 1130, a behavior feature model can be utilized to detect behavior features such as whether the driver is sleeping, drowsy, vomiting, etc. The behavior features detected in step 1140 can be utilized in steps 1150, 1160, and 1170 to estimate a functional state, a health of the driver, and a mental state of the driver, respectively, as described previously with reference to FIG. 10.

The detected functional state, health of the driver, and the mental state of the driver can be used in step 1180 to generate an overall state of the driver. For example, the current driver state generator (1090 in FIG. 10) can be utilized to determine an overall state of the driver that is based on the detected mental, functional and health information of the driver.

The process then proceeds to step 1190, wherein the generated state of the driver from step 1180 may be output to be included in the current mode risk report generator (740 in FIG. 7) and/or to utilized by the switch risk determiner, and switch risk evaluator e.g., to determine the risk associated with the current mode in which the vehicle is being operated.

Figure 12:
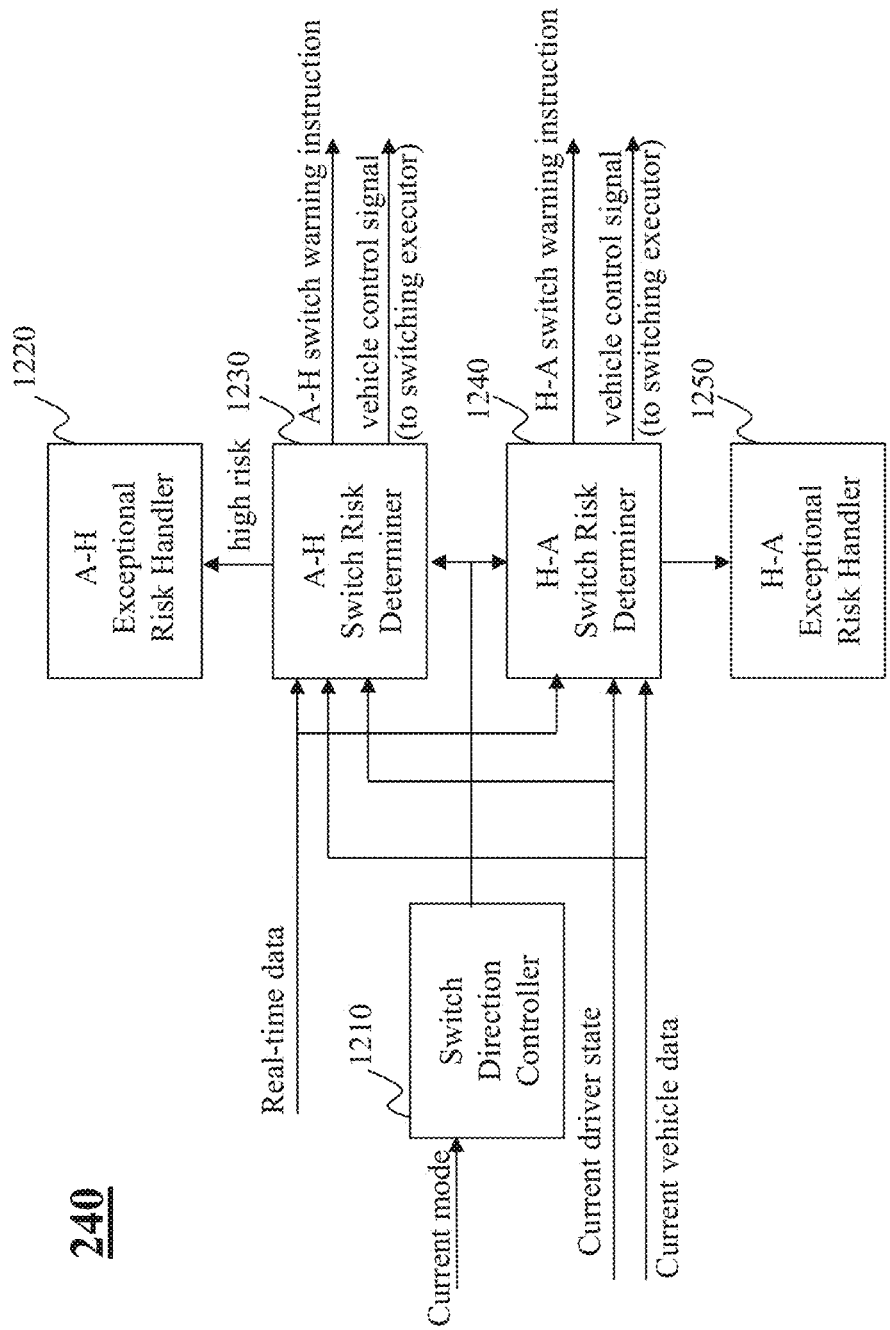
FIG. 12 depicts an exemplary block diagram of a switch risk determiner included in the driving mode switching unit, according to an embodiment of the present teaching.

FIG. 12 depicts an exemplary block diagram of a switch risk determiner 240, according to an embodiment of the present teaching. The switch risk determiner 240 comprises a switch direction controller 1210, an autonomous to human (A-H) mode switch risk determiner 1230, an A-H exceptional risk handler 1220, a human to autonomous (H-A) mode switch risk determiner, and a H-A exceptional risk handler 1250.

The switch direction controller 1210 receives as input the current mode of operation of the vehicle. Based on the current mode, the switch direction controller 1210 activates one of the A-H switch risk determiner 1230 and H-A switch risk determiner 1240. As described later with reference to FIGS. 14 and 17, respectively, the A-H switch risk determiner 1230 determines a risk associated in transitioning from the autonomous mode of operation to a human driver mode of operation of the vehicle, whereas the H-A switch risk determiner 1240 determines risk associated in transitioning from the human driver mode to the autonomous mode of operation of the vehicle.

By one embodiment, the A-H switch risk determiner 1230 and the H-A switch risk determiner 1240, respectively generate the vehicle control signals based on a determination that the risk associated in switching the current mode of the vehicle is below a predetermined threshold level. The vehicle control signals can be transmitted by the A-H switch risk determiner 1230 and the H-A switch risk determiner 1240, respectively, to a switch executor (e.g., block 280 in FIG. 2) to instruct the vehicle control (260 in FIG. 2) to perform the respective switch in the operating mode of the vehicle.

Moreover, the A-H switch risk determiner 1230 and the H-A switch risk determiner 1240, respectively generate the following signals: A-H switch warning instruction and the H-A switch warning instruction (described later with reference to FIG. 14 and FIG. 17A, respectively). By one embodiment, both the A-H switch warning instruction and the H-A switch warning instruction are associated with a set of tasks to be performed by the driver of the vehicle so that a successful switching of the operating mode of the vehicle can occur.

However, if the A-H switch risk determiner 1230 or the H-A switch risk determiner 1240 determine that the risk associated with the switching of the operation mode of the vehicle is unacceptable (i.e., a high-risk mode), the A-H switch risk determiner 1230 and the H-A switch risk determiner 1240, respectively activate the A-H exception risk handler 1220 and the H-A exception risk handler 1250. As stated previously, the A-H exception risk handler 1220 and the H-A exception risk handler 1250 may be configured by one embodiment to perform safety related functions such as bringing the vehicle to an immediate halt, initiating a call for assistance to governmental authorities (e.g., automatically dialing 911 or calling for roadside assistance via a mobile phone associated with the vehicle), transmitting GPS location of the vehicle to a server that monitors the operations of the particular vehicle and other like vehicles. It must be appreciated that in order to perform the above stated functions of bringing the vehicle to a complete halt may include processing steps such as determining a current speed of the vehicle, a current lane in which the vehicle is traversing, neighboring traffic, identifying a shoulder region on the road (e.g., a pull-over zone), and gradually bringing the vehicle to a complete halt in a safe manner.

Figure 13:
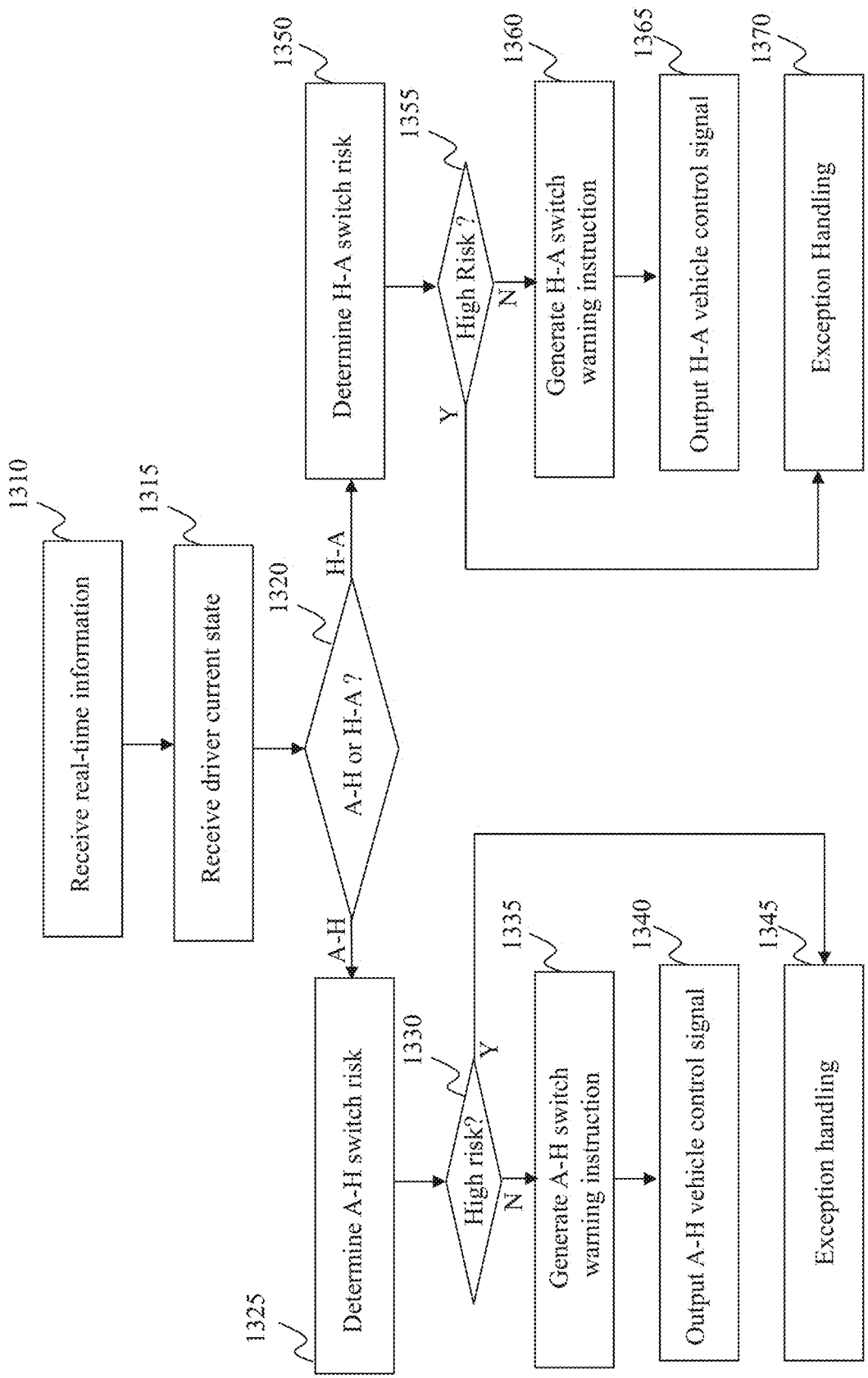
FIG. 13 depicts an illustrative flowchart outlining an exemplary process performed by the switch risk determiner, according to an embodiment of the present teaching.

FIG. 13 depicts an illustrative flowchart outlining an exemplary process performed by the switch risk determiner 240, according to an embodiment of the present teaching. The process commences in step 1310, wherein real-time information (described previously with reference to FIG. 4) is obtained by the switch risk determiner. In step 1315, the switch risk determiner receives information pertaining to a current state of the driver. For example, the switch risk determiner obtains the current state of the driver from the current driver state generator 1090 in FIG. 10.

The process further proceeds to step 1320, wherein a query is performed to determine whether the vehicle intends to switch from an autonomous mode to human-driven (A-H) mode of operating the vehicle, or the vehicle intends to switch from the human-driven to autonomous (H-A) mode of operating the vehicle. If the response to the query is a switch from the autonomous mode to human-driven mode (i.e., A-H switch), the process moves to step 1325. If the response to the query is a switch from the human-driven to autonomous mode (i.e., H-A), the process moves to step 1350.

In step 1325, the switch risk determiner determines a risk associated in performing the switch from the autonomous mode to human-driven mode of operating the vehicle. As will be described in detail later with reference to FIG. 14 and FIG. 17B, while switching from the autonomous mode to the human driver mode, a set of estimated tasks are presented to the driver to be performed in order to switch the operating mode of the vehicle. Based on whether the driver performs the set of estimated tasks, the A-H switch risk determiner 240 determines a risk associated with switching the vehicle to the human-driver mode.

Thereafter, the process in step 1330 performs a query to determine whether a high risk is associated in transitioning to the human driven mode. If the response to the query is affirmative, the process moves to step 1345, wherein the exception handling process is performed. However, if the response to the query in step 1330 is negative, the process moves to step 1335.

In step 1335, the process generates an A-H switch instruction warning, which is associated with a set of tasks to be performed by the driver of the vehicle before a successful switch to the human-driven mode of operating the vehicle can occur. Thereafter, the process in step 1340 generates (and outputs) the A-H vehicle control signal to instruct the control system of the vehicle to perform the switching operation concurrently with the driver performing the set of estimated tasks.

Similar to steps 1325 to 1345 described above, the switch risk determiner in steps 1350 to 1370 performs functions related to a switch from the human-driven mode to autonomous mode of operating the vehicle. Specifically, in step 1350, the switch risk determiner determines a risk associated in performing the switch from the human-driven mode to autonomous mode of operating the vehicle.

The process then moves to step 1355, wherein a query is made to determine whether a high risk is associated in transitioning to the autonomous mode of operating the vehicle. If the response to the query is affirmative, the process moves to step 1370, wherein the exception handling process is performed. However, if the response to the query in step 1335 is negative, the process moves to step 1360.

In step 1360, the process generates an H-A switch instruction warning, which is associated with a set of tasks to be performed by the driver of the vehicle at which time a successful switch to the autonomous mode of operating the vehicle can occur. Thereafter, the process in step 1365 generates (and outputs) the H-A vehicle control signal to instruct the vehicle control system to perform the switch to the autonomous mode of operation.

Figure 14:
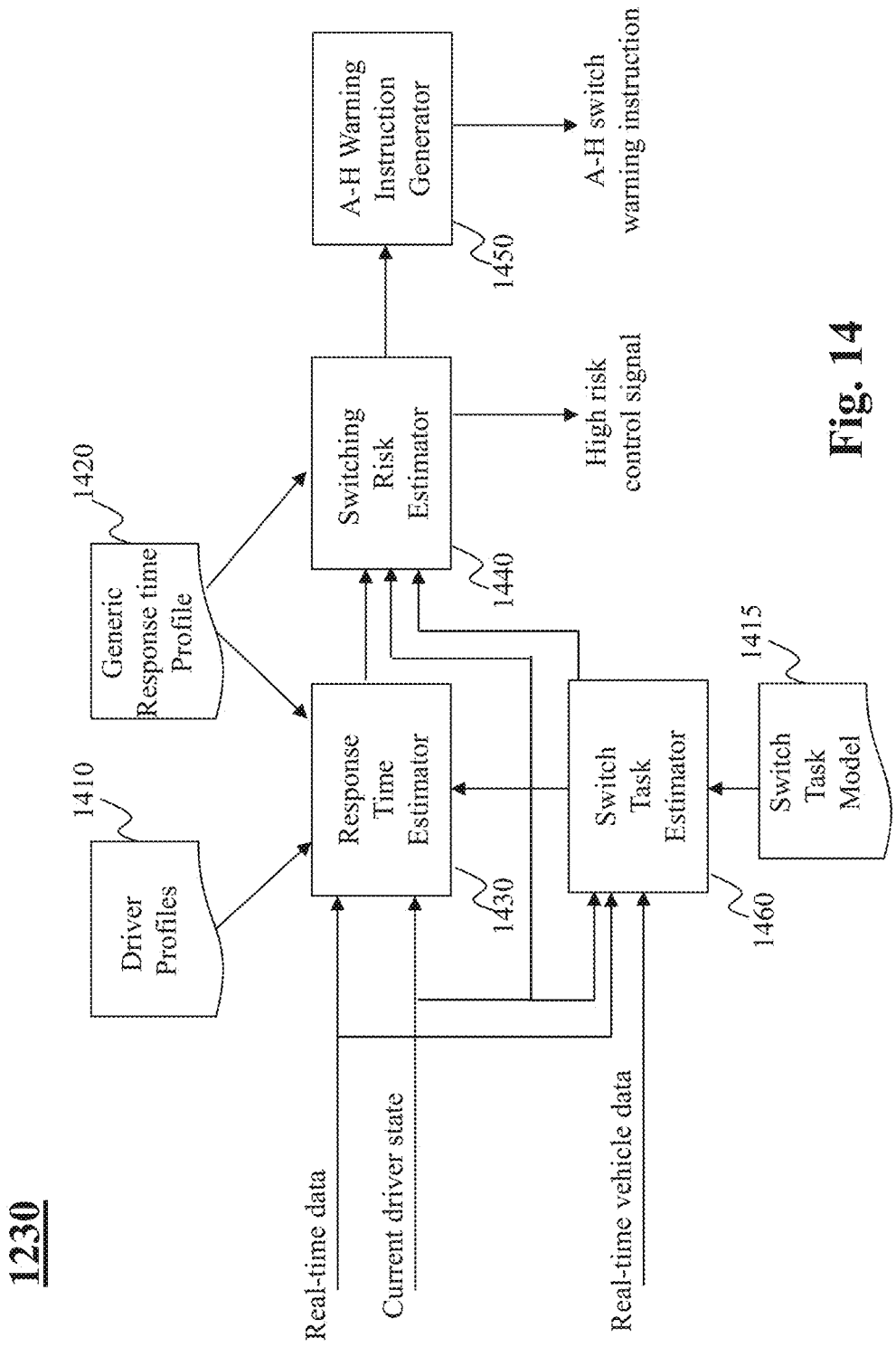
FIG. 14 depicts an exemplary block diagram of an autonomous mode to human-driver (A-H) mode switch risk determiner, according to an embodiment of the present teaching.

FIG. 14 depicts an exemplary block diagram of an autonomous mode to human-driver/manual (A-H) mode switch risk determiner 1230, according to an embodiment of the present teaching. As stated previously, the A-H switch risk determiner 1230 is configured to determine risk associated in switching the mode of operation of the vehicle from the autonomous mode to the human-driver mode of operation. As shown in FIG. 14, the A-H switch risk determiner 1230 comprises driver profiles 1410, generic response time profiles 1420, a response time estimator 1430, a switch task estimator 1460, a switch task model 1415, a switching risk estimator 1440, and an A-H warning instruction generator 1450.

By one embodiment of the present disclosure, based on a degree/level of risk associated with the current mode (i.e., the autonomous mode with respect to FIG. 14) of operation of the vehicle, the A-H switch risk determiner 1230 determines an amount of time within which the vehicle should transition to the human-driven mode to avoid hazardous scenarios. For example, consider the case of the vehicle being driven in the autonomous mode along a road which is covered with dense fog. In this case, the sensors of the vehicle may not be able to detect vehicles in its vicinity in an accurate manner, and thus it may not be feasible to continue operating the vehicle in the autonomous mode. Based on the risk associated with the autonomous mode of operation (determined for example, based on real-time fog conditions, an amount of traffic in the area, etc.), the A-H switch risk determiner 1230 may determine an amount of time within which a transition to the human mode of operating the vehicle should be made for safety concerns.

Further, the switch task estimator 1460 receives as input, the current passenger state, real-time data and real-time vehicle data. As described previously with reference to FIGS. 4 and 5, the real-time data includes intrinsic and extrinsic capabilities of the vehicle, while the real-time vehicle data includes information pertaining to the location of the car, environment in which the vehicle is currently positioned in, an amount of visibility, in-service information of the vehicle and the like. By one embodiment, based on the received inputs, and in accordance with the switch task model 1415, the switch task estimator 1460 determines a set of tasks that are to be performed by the driver that enable the switching of the operation mode of the vehicle from autonomous to human-driver mode. Additionally, by one embodiment, the switch task estimator 1460 receives the current driver state and determines whether the driver can perform any tasks. For instance, if the state of the driver is such that the driver is completely un-alert, passed out or the like, the switch task estimator may signal the switching risk estimator 1440 that there is a high risk associated in switching the operating mode of the vehicle to the human-driver mode and thus instructs the switch risk estimator 1440 to implement the exception handling process as described previously.

Before switching to the manual mode of operation of the vehicle, a determination may be required to verify whether the driver is capable of operating the vehicle. Such determinations may include verifying the pose of the driver, determining an alertness of the driver and the like. By one embodiment, the alertness of a driver may be determined by posing a series of tasks to the driver (wherein, for example, the tasks can be displayed in the form of instructions on a display panel included in the vehicle), and determining whether the driver performs the instructed tasks in a satisfactory manner. Such tasks may include instructing the driver to perform a lane change, displaying an object (e.g., blinking icon) on the display panel of the vehicle and tracking a movement of the driver's eyes in order to determine a level of alertness and the like. Moreover, an amount of time may be required to determine a health of the driver e.g., via medical sensors such as blood pressure, heart-rate monitor and the like that measure vital signs of the driver which are processed by a processor (described later with reference to FIG. 24) included in the vehicle system.

Further, based on the real-time information received by the switch task estimator 1460, a set of tasks may be estimated for the driver to perform in order to successfully transition the vehicle to the human-driver mode. It must be appreciated that the set of tasks estimated by the switch task estimator 1460 in accordance with the switch task model 1415 are in no way limited the tasks as described above.

As shown in FIG. 14, the output of the switch task estimator 1460 i.e., the estimated tasks to be performed (e.g., by the human driver of the vehicle) to initiate the switch to the manual mode of operation of the vehicle are input to the response time estimator 1430. The response time estimator 1430 estimates an amount of time required by the driver of the vehicle to perform the set of estimated tasks. Specifically, the response time estimator 1430 estimates an amount of time required by the driver to complete each of the tasks estimated by the switch task estimator 1460. By one embodiment, the response time estimator 1430 estimates the amount of time required to perform the tasks based on a current passenger state, a driver profile 1410, and a generic response time profile 1420. It must be appreciated that the current passenger state can be obtained, as described previously, from the current state generator (1090 in FIG. 10), which is included in the driver state analyzer (i.e., block 710 in FIG. 7).

The driver profile 1410 may include information related to the driving history of the driver, e.g., a number of violations the driver has been involved in a predetermined prior time-period, and a model of the vehicle the driver is operating, and characteristics of the driver such as whether the driver is handicapped, short-sighted and the like. Moreover, the driver profile 1410 may comprise an alertness score of the driver that may be computed based on prior mode switching operations from autonomous to manual mode, and the corresponding times required by the driver in those switching operations to perform the set of estimated tasks. Additionally, information from the generic response time profile 1420, which includes for instance, an amount of time consumed by other drivers (having a similar profile as the current driver) in performing the set of estimated tasks may be used by the response time estimator 1430 to estimate the amount of time required (by the current driver) to perform the set of estimated tasks.

Figure 16:
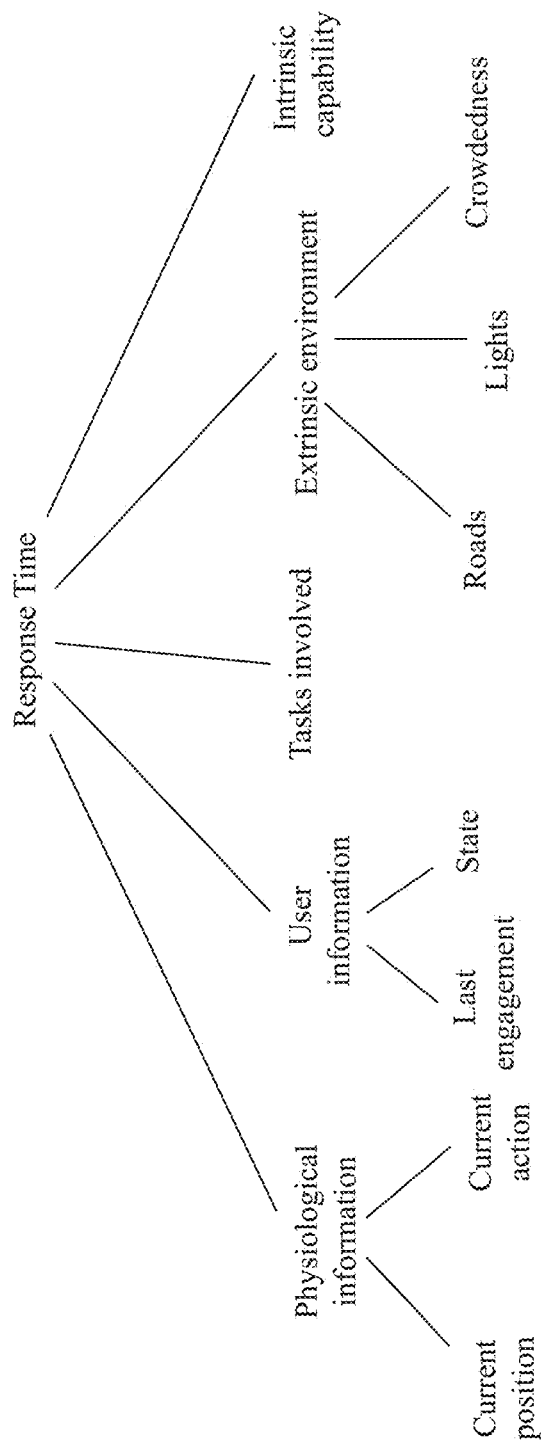
FIG. 16 depicts a graph illustrating information associated with response time in accordance with various embodiments of the present teaching.

By one embodiment, as shown in FIG. 16, the response time required to perform the set of estimated tasks may be determined based on physiological information of the driver (e.g., a current position or pose of the driver), user/driver information (e.g., time required in prior engagement in transition of manual mode of operation, a state of the driver etc.), extrinsic factors such as road conditions, an amount of visibility on the road, an amount of traffic on the road, and intrinsic capabilities of the vehicle such as a permissible speed of the vehicle, capable safety of the vehicle, a condition of the vehicle (e.g., number of faults in the vehicle) and the like.

The estimated set of tasks to be performed and the corresponding response time estimated in performing the tasks are input to the switching risk estimator 1440. By one embodiment, the switching risk estimator 1440 compares the estimated time required to perform the tasks ($T_E$) to the amount of time (T) within which the vehicle should transition to the different mode (human-driver mode in the present embodiment). It must be appreciated that the estimated time to perform the set of tasks is determined by the generic response time profile 1420. If the estimated time ($T_E$) is greater than (T), the switching risk estimator 1440 generates a high-risk control signal indicating that a risk associated with transitioning to the manual mode of operation is high i.e., the risk of switching to the human-driver mode is high. In such situations, the A-H switch risk determiner 1230 may perform the previously described exception handling operations. However, if the estimated time ($T_E$) is lower than (T), the switching risk estimator 1440 activates a A-H switch instruction generator 1450. The A-H switch instruction generator 1450 generates an A-H switch warning instruction signal that is associated with the set of tasks that are to be performed by the driver of the vehicle to successfully switch the operating mode of the vehicle to the human-driven mode.

Figure 15:
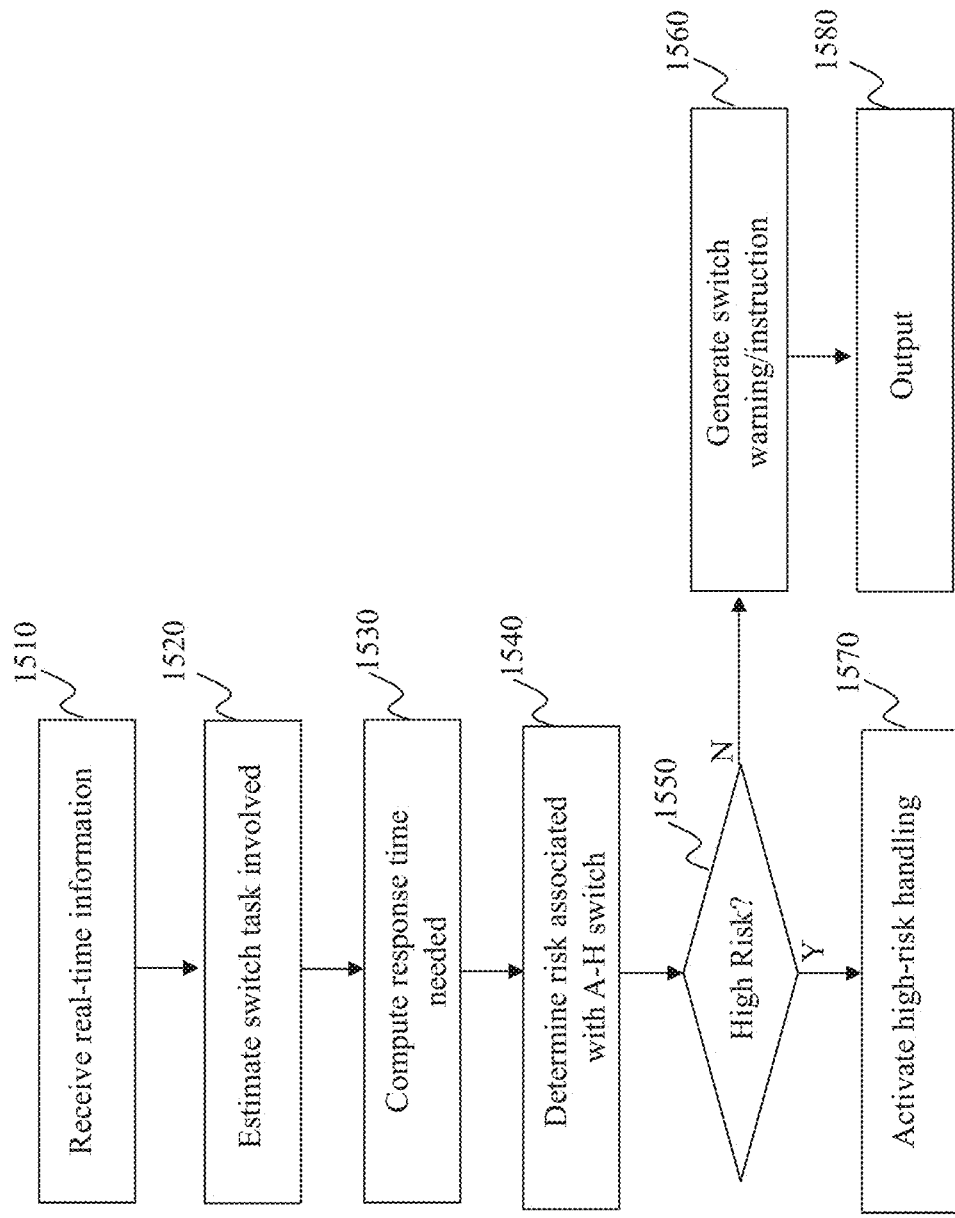
FIG. 15 depicts an illustrative flowchart outlining an exemplary process performed by the (A-H) mode switch risk determiner, according to an embodiment of the present teaching.

Turning to FIG. 15, there is depicted according to an embodiment of the present disclosure, an illustrative flowchart outlining an exemplary process performed by the (A-H) mode switch risk determiner. The process commences in step 1510 wherein the (A-H) switch mode risk determiner receives real time information including intrinsic and extrinsic capabilities of the vehicle as well as real-time vehicle data.

The process then moves to step 1520, wherein the (A-H) switch mode risk determiner estimates a set of tasks to be performed by the human driver to successfully switch the operating mode of the vehicle to the human-driven mode. Note that by one embodiment, the set of tasks can be estimated based on the received real-time information in accordance with a switch task model.

In step 1530, a response time i.e., an amount of time required by the driver of the vehicle to complete each of the set of tasks is estimated. It must be appreciated that the response time can be computed based on at least one of the driver profile, the current driver state, and the generic response time profile as described previously with reference to FIG. 14.

The process further proceeds to step 1540, wherein a risk associated with switching the operating mode of the vehicle to the human-driven mode is determined. As stated previously, the switching risk can be determined based on a comparison of the total estimated time of performing the set of tasks, and a time within which the vehicle should transition to the different mode (e.g., human-driver mode) that is determined based on a level of risk associated with operating the vehicle in the current mode (e.g., autonomous mode).

Thereafter, the process in step 1550 performs a query to determine whether the determined risk (in step 1540) is high. For instance, a determination is made to verify whether the determined risk of step 1540 violates a certain criterion e.g., $T_E$ is greater than T. If the response to the query in step 1550 is affirmative, the process proceeds to step 1570, else the process moves to step 1560.

In step 1560, corresponding to the case where the determined risk of step 1540 does not violate the criterion (i.e., $T_E$ is lower than T) the process generates the A-H switch warning instruction signal, which is further utilized in step 1580 to output (e.g., display on the panel) the set of estimated tasks to the driver of the vehicle. Details regarding presenting the driver with the set of tasks is described later in greater detail with reference to FIGS. 19 and 21. However, if the risk in step 1550 is determined to be high, the process in step 1570 executes the exception handling procedures as previously described.

Figure 17A:
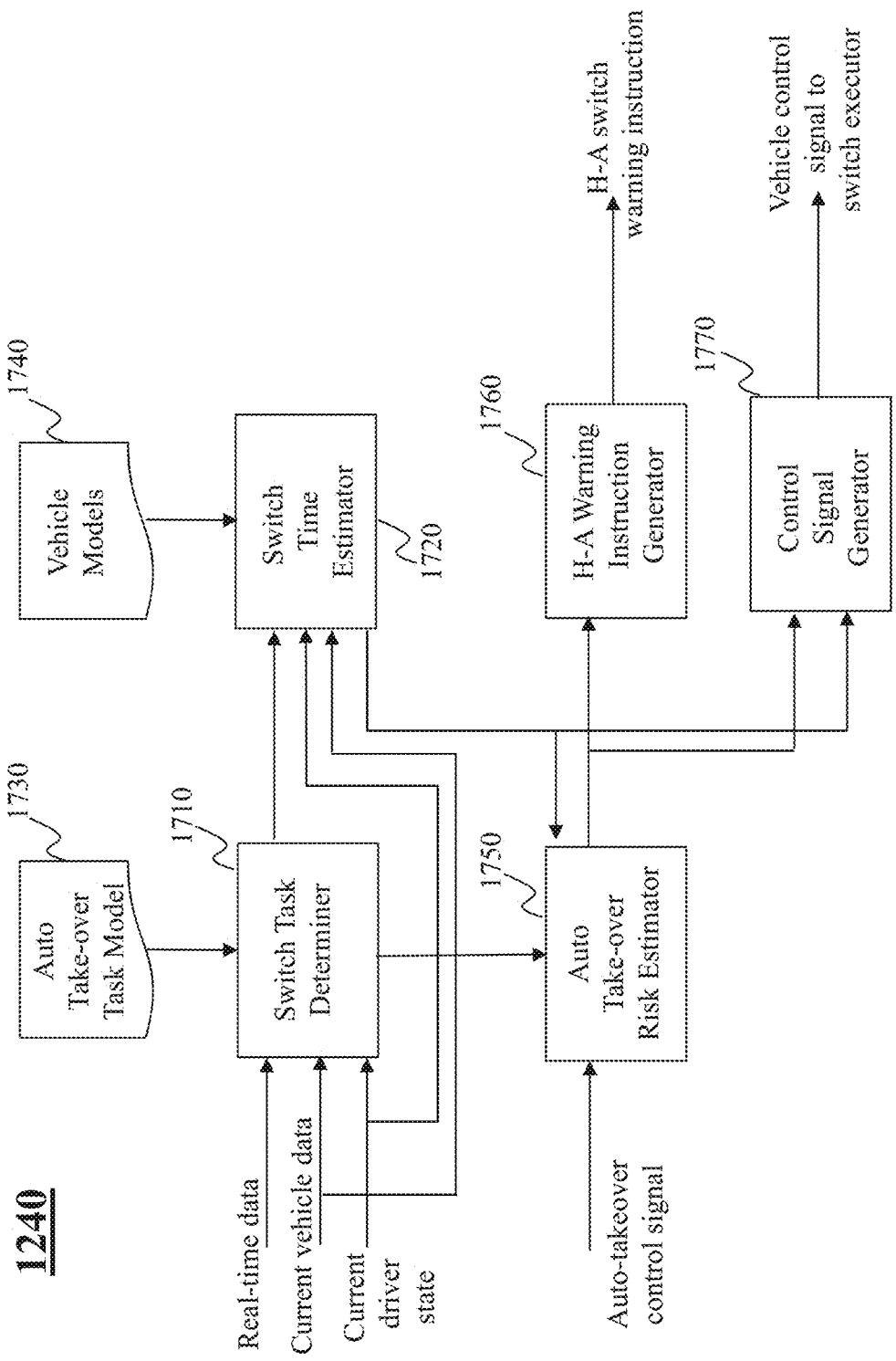
FIG. 17A depicts an exemplary block diagram of a human-driver mode to autonomous (H-A) mode switch risk determiner, according to an embodiment of the present teaching.

FIG. 17A depicts an exemplary block diagram of a human-driver to autonomous (H-A) mode switch risk determiner 1240, according to an embodiment of the present teaching. As stated previously, the H-A switch risk determiner 1240 is configured to determine a risk in switching the mode of operation of the vehicle from the manual mode to the autonomous mode of operating the vehicle. As described below, based on the estimated risk in switching the mode of operation of the vehicle, the (H-A) switch mode risk determiner 1240 determines whether it is feasible to switch to the autonomous mode (from the human-driver mode) of operating the vehicle.

As shown in FIG. 17A, the H-A switch risk determiner 1240 comprises a switch task determiner 1710, a switch time estimator 1720, an auto take-over risk estimator 1750, an auto take-over task model 1730, a vehicle model 1740, an H-A warning instruction generator 1760, and a control signal generator 1770. The switch task determiner 1710 receives as input, real-time data, real-time vehicle data, and the current driver state. As described previously with reference to FIGS. 4 and 5, the real-time data includes intrinsic and extrinsic capabilities of the vehicle, while the real-time vehicle data includes information pertaining to the location of the car, environment in which the vehicle is currently travelling in, an amount of visibility in the environment, in-service information of the vehicle and the like information. Moreover, the switch task determiner 1710 receives as input the current passenger state, which is generated by the user state generator as described previously in FIG. 10.

Based on the received inputs, the switch task determiner 1710 utilizes an auto take-over task model 1730 to generate a set of tasks that are to be performed (e.g., by the vehicle) in the autonomous mode of operation. For instance, by one embodiment, the set of tasks may include controlling a speed of the vehicle (i.e., reducing or increasing the speed the vehicle based on proximate traffic), controlling maneuverability of the vehicle (i.e., controlling a steering wheel functionality of the vehicle), changing a lane in which the vehicle is currently travelling in, determining (for safety purposes) whether the location of the vehicle is in a zone that restricts autonomous driving (e.g., certain geographical locations such as school zones, certain regions on freeways such as toll-booths etc.). It must be appreciated that each of the above described tasks that are to be performed in the autonomous mode may be associated with a task that is to be performed by the driver of the vehicle to ensure a smooth transition from the human-driven mode to the autonomous mode of operating the vehicle. For instance, the tasks to be performed by the driver may include removing the driver's feet from the accelerator and/or brakes, as the vehicle is about to be controlled in an automated manner in the autonomous mode of operation. Another task that may be required to be performed by the driver may include the driver removing his hands from the steering wheel to relinquish control of maneuverability of the vehicle to the automated system.

By one embodiment of the present disclosure, the H-A switch risk determiner 1240 observes the current state of the driver to determine whether the driver is capable of performing any of the above-mentioned tasks. For instance, if it is determined that the driver if the vehicle is completely passed out, the H-A switch risk determiner 1240 may initiate an immediate takeover by the autonomous function of the car i.e., the car will operate in the autonomous mode immediately. It must be appreciated that if a complete autonomous takeover of the vehicle is not possible, the H-A switch risk determiner 1240 may execute the exception handling process as stated below.

By one embodiment, the sequence of determined tasks, driver state, as well as the current vehicle data is input to the switch time estimator 1720. Based on the received inputs, the switch time estimator 1720 utilizes the vehicle model 1740 to estimate an amount of time required by the vehicle and/or correspondingly by the driver of the vehicle to perform the respective determined tasks. By one embodiment, the vehicle model 1740 includes information pertaining to the prior operation of the current vehicle, such as an average amount of time required by the vehicle to change its speed from a first operating speed to a second operating speed, an amount of time required by the vehicle to change its operating lane, which may be based on nearby traffic, an amount of time required by the vehicle to control maneuverability of the vehicle and the like. Thus, by one aspect, the switch time estimator 1720 utilizes the real-time information to estimate the time required by the vehicle to perform a certain task in accordance with the vehicle model 1740.

By one embodiment, the switch time estimator 1720 estimates a total time required by the vehicle and/or correspondingly by the driver of the vehicle to perform all the respective estimated tasks. The total estimated time is input to the auto take-over risk estimator 1750. The auto take-over risk estimator 1750 receives as input, the auto take-over control signal that may be generated by the switch direction controller 1210 of FIG. 12. Specifically, the auto take over control signal activates the auto take over risk estimator 1750 when the switch direction controller (1210 in FIG. 12) determines that a transition to the autonomous mode of operation is to be performed. The auto take-over risk estimator 1750 evaluates a risk associated with transitioning to the autonomous mode of operation of the vehicle.

By one embodiment, the risk associated in switching to the autonomous mode may be determined based on the level/degree of risk associated with the current mode of operation of the vehicle. For instance, similar to the description provided previously with regard to the A-H switch risk determiner, the H-A switch risk determiner determines a level of risk associated in operating the vehicle in the human-driver mode. Based on the risk level, the H-A switch risk determiner obtains an amount of time within which the vehicle should switch to the autonomous mode of operation for safety concerns. Further, based on a comparison of the estimated time required to perform the tasks (e.g., by the vehicle) to the amount of time within which the vehicle should switch the mode of operation, the auto take-over risk determiner 1750 may compute a risk associated with switching the vehicle to the autonomous mode.

Based on the evaluated risk being within acceptable, the auto take-over risk estimator 1750 activates the H-A warning instruction generator 1760 and the control signal generator 1770. By one embodiment, the H-A warning instruction generator 1760 generates an H-A switch warning instruction signal thereby indicating to the driver that the vehicle is to be imminently transitioned to the autonomous mode of operation. Additionally, the user warning instruction generator 1760 may use audio/visual mechanisms (described later with reference to FIGS. 19 and 21) to indicate to the driver the tasks that are to be performed to successfully transition the vehicle to the autonomous mode of operation.

As stated above, it must be appreciated that in the present embodiment, each of the functions/tasks that are to be performed by the driver of the vehicle correspond to a task that is to be performed in the autonomous mode of operation. For instance, if one of the tasks determined by the auto take-over task model 1730 is that of reducing the speed of the vehicle, then such a task may correspond to the driver removing his/her feet from the gas pedal. The execution of the H-A switch warning instruction signal is described later in detail with reference to FIG. 19. Additionally, the takeover risk estimator 1750 triggers the control signal generator 1770 to generate a vehicle control signal that is to be transmitted to the switch executor (e.g. unit 280 in FIG. 2). The switch executor in turn, activates the vehicle control system (unit 260 in FIG. 2) indicating that a switch over to the autonomous mode of operation is being performed. It must be appreciated that if the risk estimator 1750 determines that the risk associated in transitioning to the autonomous mode is unacceptable, the risk estimator 1750 may signal the control signal generator 1770 to instruct the switch executor 280 to perform exception handling.

Additionally, by one embodiment, when the risk associated in transitioning to the autonomous mode is unacceptable, the risk estimator 1750 may perform a plurality of additional functions prior to performing the exception handling functions. For instance, instead of switching from the human-driver mode to a fully autonomous mode of operating the vehicle as described above, the H-A switch risk determiner, may determine a risk associated in switching the vehicle from the human-driver mode to a lower level of autonomous mode of operating the vehicle.

FIG. 17B provides a classification of a number of modes of operation of the vehicle based on six different levels (ranging from fully manual to fully automated systems), according to an embodiment of the present teaching. The classification can be based on an amount of driver intervention and attentiveness required. As depicted in FIG. 17B, there are six modes/levels of operation of the vehicle:

Mode 0 wherein an automated system issues warning(s) but has no vehicle control.

Mode 1 (also referred to herein as a 'hands-on' mode) is a mode wherein the driver and the automated system of the vehicle share control of the vehicle. For instance, Adaptive Cruise Control (ACC) where the driver controls the steering functionality and the automated system controls the speed of the vehicle is an example of mode 1 operation. Additionally, features such as Parking Assistance, wherein the steering is automated while speed is manual, as well as Lane Keeping Assistance (LKA) are examples of mode 1 operation of the vehicle. In mode 1 operation, the driver must be ready to retake full control of the vehicle at any time.

Mode 2 (also referred to herein as 'hands-off' mode) is a mode of operation, wherein the automated system takes full control of the vehicle (accelerating, braking, and steering). The driver monitors the driving and is expected to be prepared to immediately intervene at any time if the automated system fails to respond properly.

Mode 3 (also referred to as 'eyes-off' mode) is a mode wherein the driver can safely turn his/her attention away from the driving tasks, e.g. the driver can text or watch a movie. The vehicle handles situations that call for an immediate response, like emergency braking. In this mode, the driver must still be prepared to intervene within some limited time, specified by the manufacturer, when called upon by the vehicle to do so. When activated by the human driver the car takes full control of all aspects of driving in slow-moving traffic at up to 60 kilometers per hour. In some instances, the vehicle is programmed to operate in this mode, only on highways having a physical barrier separating the oncoming traffic.

Mode 4 (also referred to herein as 'mind-off' mode), is like mode 3, but no driver attention is ever required for safety, i.e. the driver may safely go to sleep or leave the driver's seat. By one embodiment, self-driving capability is supported only in limited areas or under special circumstances, like traffic jams. Outside of these areas or circumstances, the vehicle must be able to safely abort the trip, i.e. park the car, if the driver does not retake control.

Mode 5 (also referred to herein as 'steering wheel optional' mode), where no human intervention is required. Thus, as stated previously, the drive mode switching unit 130, by one embodiment, may be configured to switch the operating mode of the vehicle from one of the above described modes to another mode.

Thus, by one embodiment, the H-A switch risk determiner may determine the risk associated in switching from the human driver mode to all the levels of the autonomous mode as shown in FIG. 17B. It must be appreciated that switching to a lower level of autonomous control of the vehicle may require a lesser number of tasks to be performed by the autonomous system of vehicle as compared to switching to the fully autonomous level. However, the lower level of autonomous control may require an increased alertness level of the driver.

Figure 18:
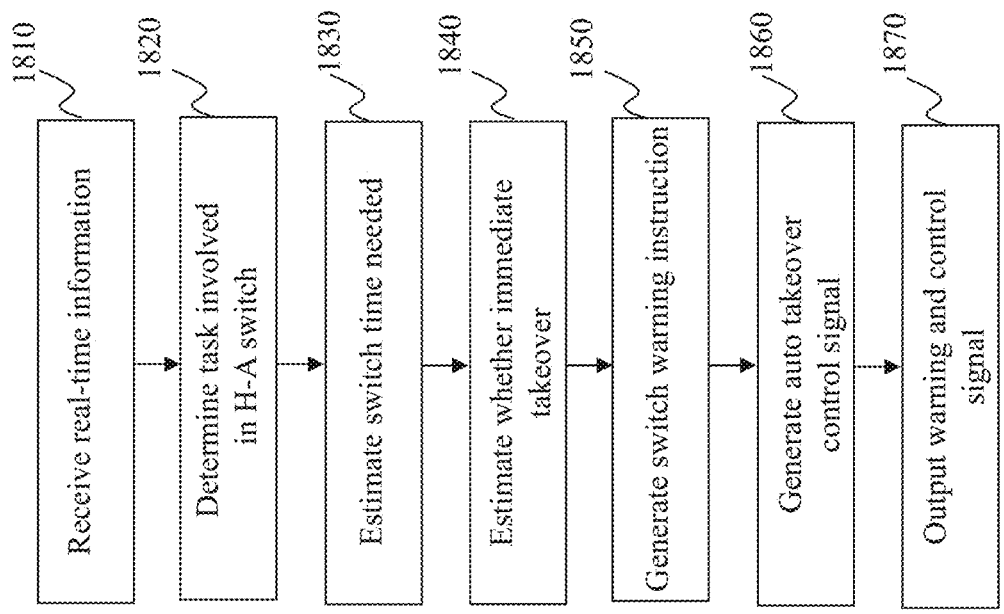
FIG. 18 depicts an illustrative flowchart outlining an exemplary process performed by the (H-A) mode switch risk determiner, according to an embodiment of the present teaching.

Turning to FIG. 18, there is depicted according to an embodiment of the present disclosure, an illustrative flowchart outlining an exemplary process performed by the (H-A) switch mode risk determiner. The process commences in step 1810 wherein the (H-A) switch mode risk determiner receives real time information including current driver state, intrinsic and extrinsic capabilities of the vehicle as well as real-time vehicle data.

The process then moves to step 1820, wherein the (H-A) switch mode risk determiner estimates, in accordance with a auto take-over task model, a set of tasks to be performed by the vehicle in switching the operating mode of the vehicle to the autonomous mode. Additionally, in step 1820, the set of corresponding tasks to be performed by the driver of the vehicle may also be estimated.

In step 1830, a response time i.e., an amount of time required to complete the estimated set of tasks is estimated. It must be appreciated that the response time can be estimated based on the vehicle model. Further, in step 1840, the H-A switch risk determiner may determine urgency in performing the switch to the autonomous mode of operating the vehicle. Such a determination may be made based on an extremely high risk associated with the human-mode of operating the vehicle, which can be determined based on the current state of the driver (e.g., the driver is passed out). Additionally, in step 1840, the H-A switch risk determiner may determine a risk associated with switching the vehicle to the autonomous mode of operation.

Based on the determined risk (in step 1840) associated with switching the vehicle to the autonomous mode not violating a criterion, the process in step 1850 generates the H-A switch warning instruction signal, and a control signal (in step 1860) to indicate to the vehicular system that the vehicle is about to be switched to the autonomous mode of operation.

Further, the process in step 1870 outputs the generated signals of steps 1850 and 1860. For instance, the switch warning instruction signal may be output (e.g., on a display panel) to display the set of estimated tasks that are to be performed by the driver of the vehicle. Details regarding presenting the driver with the set of tasks is described later in greater detail with reference to FIGS. 19 and 21.

Figure 19:
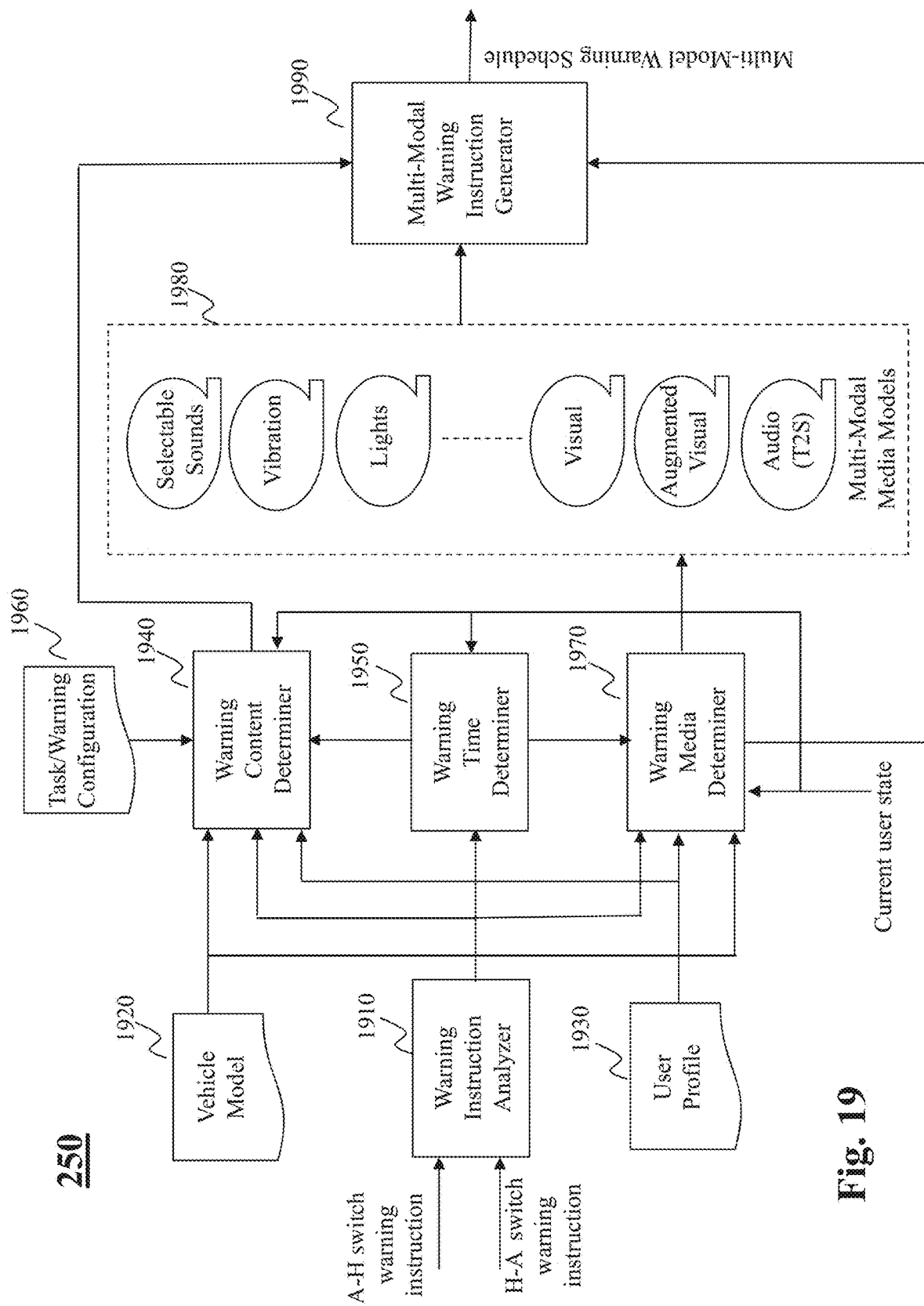
FIG. 19 depicts an exemplary block diagram of a switch warning control unit, according to an embodiment of the present teaching.

FIG. 19 depicts an exemplary block diagram of a switch warning control unit 250 included in the driving mode switching unit (block 130 in FIG. 1) of the vehicular system, according to an embodiment of the present teaching. The switch warning control unit 250 includes a warning instruction analyzer 1910, a vehicle model 1920, a user profile 1930, a warning time determiner 1950, a warning content determiner 1940, a warning media determiner 1970, a task/warning configuration model 1960, a plurality of multi-modal media models 1980, and a multi-modal warning instruction generator 1990.

By one embodiment, the warning instruction analyzer 1910 receives a warning instruction signal corresponding to a switch of the operating mode of the vehicle from autonomous to human-driven (A-H) or a switch from human-driven to autonomous (H-A) mode. Specifically, the warning instruction analyzer 1910 receives one of the A-H switch warning instruction signal from the A-H switch instruction generator (block 1450 in FIG. 14) and the H-A switch warning instruction signal from the H-A switch instruction generator (block 1760 in FIG. 17). It must be appreciated that each of the A-H switch warning instruction and the H-A switch warning instruction signals correspond to a set of tasks that are to be performed in order to switch the mode of operation of the vehicle. Moreover, the warning instruction analyzer 1910 obtains the estimate of time required to complete each task (referred to herein as task duration time).

The warning instruction analyzer 1910 inputs each analyzed task to the warning time determiner 1950. The warning time determiner 1950 determines an amount of time required to perform a warning operation (referred to herein as warning duration time). Specifically, the warning duration time corresponds to a time period wherein a warning alert is presented to the driver of the vehicle, in order to ensure that the driver performs the corresponding task in a timely manner. By one embodiment, the warning duration time for each task is determined based on a current state of the driver. Moreover, the warning duration time for each task may be adjustable based on the current state of the driver. Details regarding the adjusting of the warning time duration of each task are described later with reference to FIG. 20B.

For instance, consider a task having a task duration time of 30 seconds i.e., the driver of the vehicle is expected to complete the task within 30 seconds. In this case, the warning time determiner 1950 may determine that the warning time duration of 10 seconds is to be used to provide the warning alert to the driver thereby notifying the driver of the corresponding task that is to be performed. By one embodiment, the warning time duration is a part of the task duration time. Specifically, referring to the above example, the warning time of 10 seconds (within a time window of 30 seconds) is presented to the driver (e.g., at the beginning of the time-window) in order to notify the driver to perform the task within the estimated window of 30 seconds. It must be appreciated that the warning time having an initial duration of 10 seconds, may be extended to for example, 15 seconds upon determining that the driver has not performed the assigned task.

Thus, as sated above, the warning time determiner 1950 may determine the warning duration time for each task based on the current state of the driver. For instance, consider the case that the driver is expected to perform a certain task, and the driver state analyzer (FIG. 7) determines that the driver is not fully alert (e.g., yawning, drowsy, etc). In such a case, the warning time determiner 1950 may determine to have a longer warning time duration as compared to case where the driver state analyzer determines that the driver is fully alert. It must be noted that the task duration time for completing a certain task is estimated by the switch time-estimator (e.g., 1720 in FIG. 17) based on the driver state.

For each task, the warning time determiner 1950 inputs each task as well as the warning time duration associated with the task to the warning media determiner 1970 and the warning content determiner 1940. Moreover, the warning media determiner 1970 receives as input, information pertaining to the vehicle model 1920, a user profile 1930 corresponding to the driver operating the vehicle, and the current state of the driver of the vehicle. By one embodiment, the warning media determiner 1970 is configured to select at least one media (from the pool of multi-media models 1980) that is to be used as a platform for providing the warning to the driver. Specifically, the warning media determiner 1970 associates each task with the at least one media 1980 that is used to warn the driver to perform the respective task.

By one embodiment, the selected media can be determined based on a preference of the driver. The preference of the driver may be predetermined and stored a-priori within the driver profile 1930. Additionally, or alternatively, the type of selected media may be determined based on the state of the driver. For instance, if the driver is in a state of yawning (as determined by the driver state analyzer block 710 in FIG. 7), a visual media (i.e., a display) and/or audio media form (i.e. speakers) may be used to warn the driver. In contrast, if the driver is either sleeping or extremely drowsy, the selected media forms may include a vibration mechanism (i.e., a haptic response) and/or a combination of other media forms. As a further example, if the user/driver profile 1930 indicates that the driver of the vehicle has hearing impairments, then the warning media determiner 1970 may refrain from using audio sources to warn the driver. In such a scenario, the warning media determiner 1970 may utilize vibratory media and/or display media to warn the driver. It must be appreciated that a number of media sources 1980 that are available to the warning media determiner 1970 are determined via the vehicle model 1920 that the driver is currently operating. It must be appreciated that the selectable sound source as shown in FIG. 19 may correspond to any non-speech sounds that can be selected for warning purposes, e.g., a siren, whereas audio may correspond to specifically any speech related acoustic signal. By one embodiment of the present disclosure, the selectable sound source and the audio source can be independently selected and used to compose a multi-model augmented warning.

By one embodiment, the warning content determiner 1940 determines warning content to be associated with each task. For instance, for a display type of media, the content may correspond to a specific message to be displayed on the display panel of the vehicle. The displayed message serves as a warning to the driver of the vehicle. In a similar manner, audio content may correspond to content that is to be played via the audio system included in the vehicle. Content related to the audio or video modes of warning may also include a decibel level (i.e. how loud should an audio message be), a frequency of presenting the warning, a brightness of the display message on the panel, whether the message is being displayed with effects such as blinking and the like information.

With regard to a vibration type media warning, the warning content determiner 1940 may determine a magnitude of the vibration. For instance, if the vibration mode of warning the driver includes providing a vibration to the steering wheel or the seat of the driver, the warning content determiner may determine a magnitude with which the respective vibrations are to be imposed on the driver. As shown in FIG. 19, the warning content determiner 1940 may also utilize the task/warning configuration model 1960 to associate each task with at least one media source and present the warning to the driver.

Further, the type of media source to be used for warning purposes (as determined by the warning media determiner 1970), and the warning content (as determined by the warning content determiner 1940) are input to the multi-modal warning instruction generator 1990. Upon receiving the input from the warning content determiner 1940 and the warning media determiner 1970, the multi-modal warning instruction generator 1990 generates a sequence of tasks that are to be executed by the driver.

By one embodiment, the multi-modal warning instruction generator 1990 is also configured to generate a warning schedule of the tasks for alerting the driver. Specifically, the multi-modal warning instruction generator 1990 determines a sequence with which the tasks are to be presented to the driver. For example, the multi-modal warning instruction generator 1990 may generate a schedule based on the task duration time of each task, wherein the task having the largest task duration time is presented first to the driver. Alternatively, the multi-modal warning instruction generator 1990 may first present the task having the smallest task duration time to the driver. Additionally, the multi-modal warning instruction generator 1990 may generate a schedule of the tasks based on a critical score (i.e., a priority) associated with each task. The critical score of a task corresponds to a level of urgency of performing the task. For example, while transitioning to an autonomous mode of operating the vehicle, a task such as removing the driver's foot from the gas pedal may be deemed more important than a task such as changing a car lane before switching the operating mode of the vehicle. In such a scenario, the multi-modal warning instruction generator 1990 may generate a schedule, wherein the task of removing the driver's foot from the pedal (i.e., a task with higher priority) is presented first to the driver. In what follows, is provided a detailed description of the execution of the multi-media warning instructions with reference to FIG. 21.

Figure 20A:
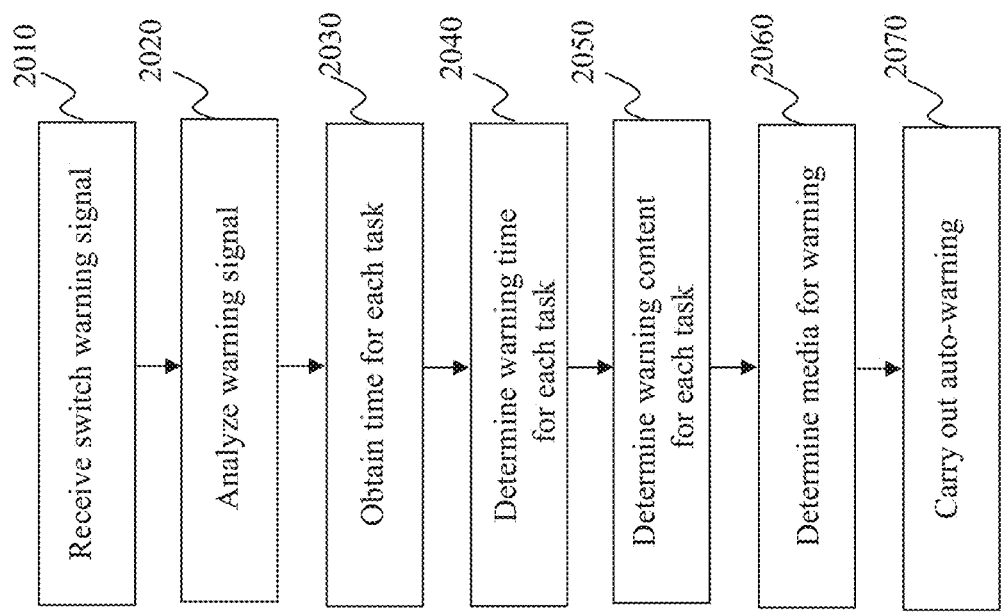
FIG. 20A depicts an illustrative flowchart outlining an exemplary process performed by the switch warning control unit, according to an embodiment of the present teaching.

FIG. 20A depicts an illustrative flowchart outlining an exemplary process performed by the switch warning control unit 250, according to an embodiment of the present teaching. The process commences in step 2010, wherein the switch warning control unit receives one of the A-H switch warning instruction and the H-A switch warning instruction.

In step 2020, the process analyzes the received switch warning instruction signal to obtain a task duration time of each task of a set of tasks (step 2030). Note that as stated previously, each task has an estimated time (i.e., the task duration time) within which the task must be performed. The process in step 2040 determines a warning duration time for each task i.e., the time required to perform a warning operation for the task. It must be appreciated that the warning duration time of each task may be determined based on the current state of the driver. Moreover, the warning duration time may be adjustable based on the state of the driver.

The process then moves to step 2050 wherein the switch warning control unit determines a warning content to be associated with each task. For example, the warning content determiner 1940, as described previously with reference to FIG. 19, determines a warning content to be associated with each task. Further, in step 2060, the switch warning control unit selects at least one media from a plurality of media sources that is to be utilized to warn the driver.

Upon determining the content and the media to be associated with each task (steps 2050 and 2060), the switch warning control unit in step 2070 generates a warning schedule of the tasks for alerting the driver. Specifically, as described previously with reference to FIG. 19, the multi-modal warning instruction generator 1990 of the switch warning control unit determines a sequence with which the tasks are to be presented to the driver.

Figure 20B:
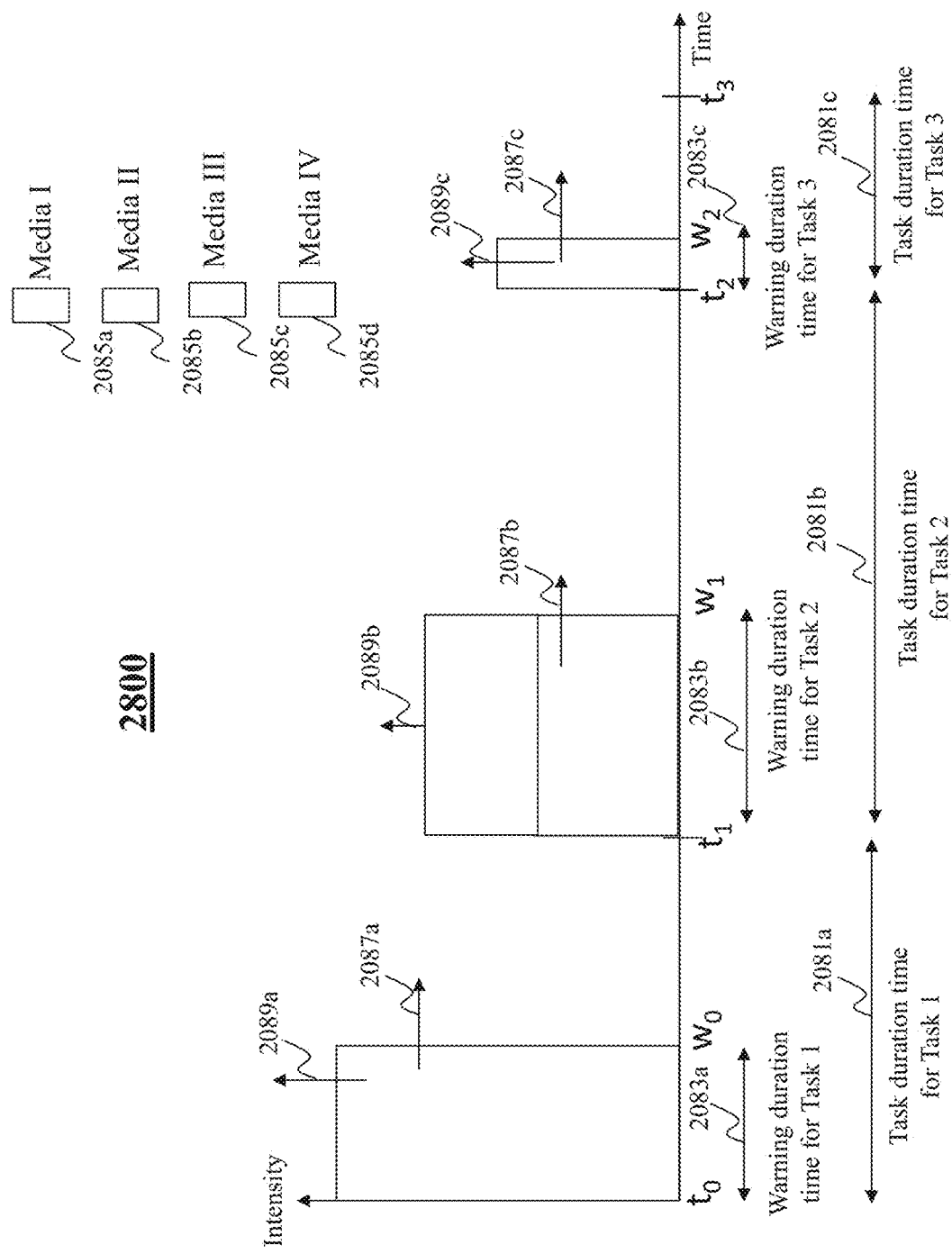
FIG. 20B depicts an exemplary task schedule illustrating different media utilized for warning the driver of the vehicle, according to an embodiment of the present teaching.

Turning now to FIG. 20B, there is depicted an exemplary task schedule 2800 illustrating different media being utilized for warning the driver of the vehicle to perform the tasks in the schedule. For sake of simplicity, FIG. 20B illustrates a schedule including three tasks (Task 1, Task 2, and Task 3, respectively), according to an embodiment of the present teaching. The task schedule 2800 comprises a first task having a task duration time 2081a of magnitude $|t_1-t_0|$, a second task having a task duration time 2081b of magnitude $|t_2-t_1|$, and a third task having a task duration time 2081c of magnitude $|t_3-t_2|$. Note that by one embodiment of the present disclosure, the task duration times are estimated based on the current driver state of vehicle.

Additionally, FIG. 20B illustrates a at least one warning media (from a set of four media sources 2085a, 2085b, 2085c, and 2085d) that is utilized for alerting the driver of the vehicle to perform the respective task. For example, as shown in FIG. 20B, media 1 (2085a) is utilized to warn the driver to perform task 1, media 2 (2085b) and media 3 (2085c) are utilized to warn the driver to perform task 2, and media 4 (2085d) is utilized to warn the driver to perform task 4. The warning duration times for each task are represented as follows: a first warning duration time 2083a associated with task 1, and having a magnitude of $|w_0-t_0|$ in time, wherein media 1 is selected to warn the driver to perform task 1. Note that media 1 is activated for the warning duration time 2083a to warn the driver to perform task 1. Similarly, for task 2 a combination of media 2 and media 3 (2085b and 2085c) are selected to warn the driver to perform task 2. Note that media 2 and 3 are concurrently activated for the warning duration time 2083b (i.e., having magnitude $|w_1-t_1|$) to warn the driver to perform task 1. In a similar manner, a third warning duration time 2083c associated with task 3, and having a magnitude of $|w_2-t_2|$ in time, wherein media 4 is selected to warn the driver to perform task 3.

It must be appreciated that the warning durations 2083a to 2083c are plotted along time on the X-axis and intensity on the Y-axis. The height of a particular warning duration corresponds to, for instance, an intensity level of the media source that is used for warning purposes. For example, for an audio type media, the intensity may correspond to a volume level, for a display type of media, the intensity may correspond to a brightness level of the display message that is presented to the driver.

Moreover, as shown with reference to Task 2, multiple media may be used to warn the driver of the respective task that is to be performed. Note that the multiple media used to warn a driver to perform the necessary task may be present in a concurrent fashion as depicted in FIG. 20B, and/or may be presented in a consecutive manner (i.e., one after another). Further, as previously stated the warning duration time for each task may be configurable based on the state of driver. As shown in FIG. 20B, the arrows 2087a to 2087c and 2089a to 2089c indicate that the warning durations of each media type that is used to warn the driver to perform the task may be increased based on the detected driver state.

For instance, if it is observed that upon presenting a warning, the driver has not performed the task, the time duration of the warning may be adjusted. In a similar manner, the intensity of the media type used to warn the driver to perform the respective tasks may also be adjusted as shown by arrows 2089a to 2089c. It must be appreciated that while using multiple media sources to warn the driver to perform a task (e.g., as shown in FIG. 20B for task 2), the warning duration, as well as the intensity of each media type can be controlled in an independent manner. Moreover, by one embodiment, the warning duration times for each task are preferably a fraction of the corresponding task duration times. It must be noted that the warning duration time for a particular task may have a maximum time duration that is slightly less that the corresponding task duration time (assuming that a small of time will be required by the driver of the vehicle to perform the task). Moreover, as stated previously, if the driver of the vehicle fails to perform a particular task within the estimated task duration time, the vehicle control can terminate the operation of switching the mode of the vehicle and instead initiate the exception handling process.

Figure 21:
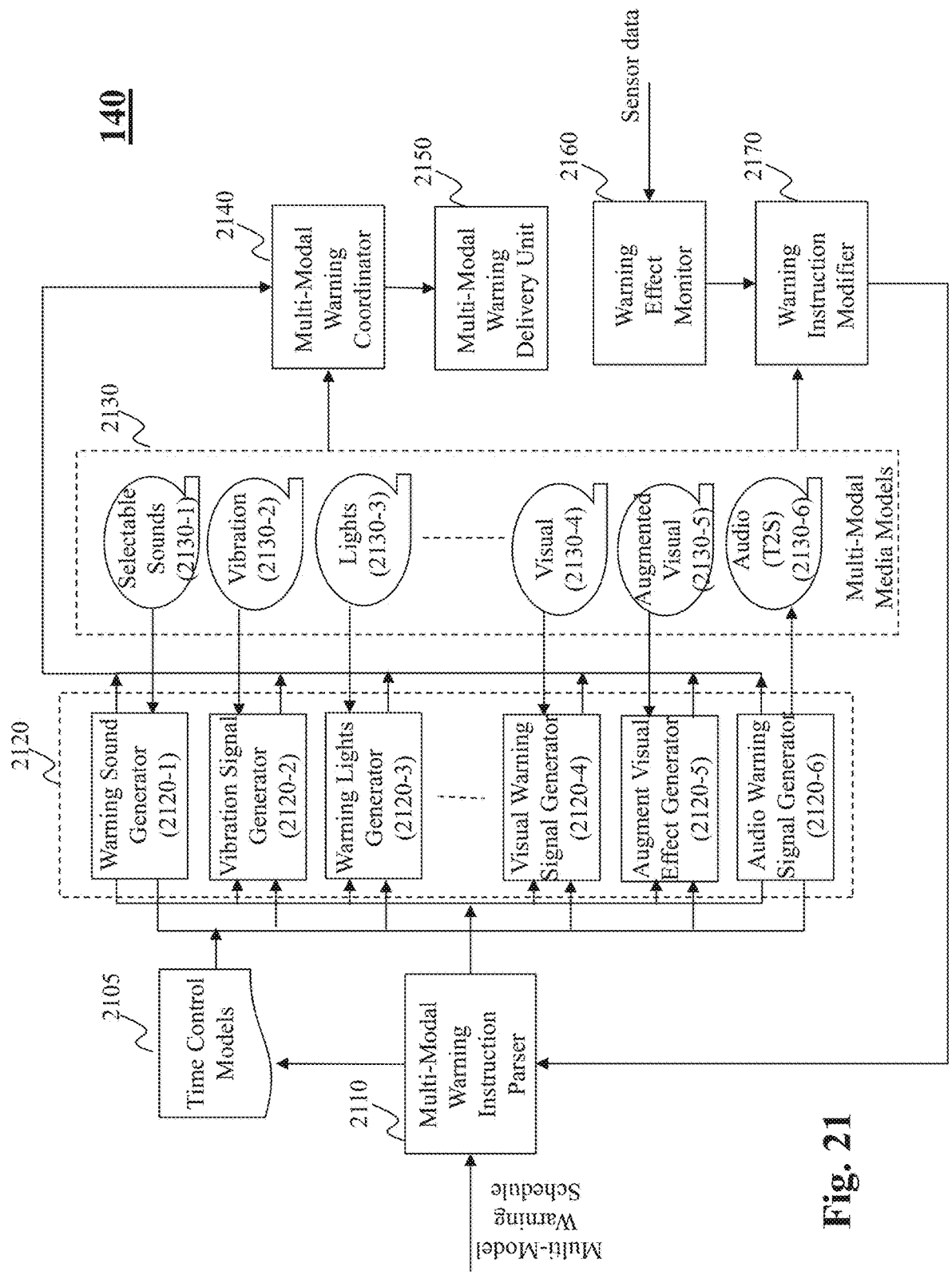
FIG. 21 depicts according to an embodiment, an exemplary block diagram of a multi-modal switching warning unit, according to an embodiment of the present teaching.

FIG. 21 depicts an exemplary block diagram of a multi-modal switching warning unit 140, according to an embodiment of the present teaching. The multi-modal switching warning unit 140 comprises a multi-modal warning instruction parser 2110, time control models 2105, a plurality of media generators 2120, a plurality of multi-modal media models 2130, a multi-modal warning coordinator 2140, a multi-modal warning delivery unit 2150, a warning effect monitor 2160, and a warning instruction modifier 2170.

The plurality of multi-modal media models 2130 include at least a selectable sound media 2130-1, a vibration media 2130-2, light 2130-3, visual media 2130-4, an augmented visual media 2130-5, and an audio media 2130-6. By one embodiment, each media included in the multi-modal media models 2130 includes a corresponding media generator that is configured to select and activate the corresponding media. For example, as shown in FIG. 21, the plurality of media generators 2120 includes at least a warning sound generator 2120-1, a vibration signal generator 2120-2, a warning light generator 2120-3, a visual warning signal generator 2120-4, an augmented visual effect generator 2120-5, and an audio warning signal generator 2120-6.

The multi-model warning instruction parser 2110 receives as input multi-model warning instructions that are generated by the switch warning control unit 250 described previously with reference to FIG. 19. The multi-model warning instruction parser 2110 is configured to parse through the set of instructions, wherein each instruction may be associated with a plurality of tasks that are to be performed by the driver of the vehicle. Note that each instruction received by the multi-model warning instruction parser 2110 includes a schedule of tasks (determined by the switch warning control unit 250 of FIG. 19) that are to be presented to the driver for execution.

By one embodiment, the multi-modal warning instruction parser 2110 utilizes the time control model 2105 to activate (at a specific time, determined by the schedule of the task set) at least one media generator 2120-1 to 2120-6, which is configured to activate the corresponding media associated with the task. Note that a specific task may be associated with multiple media sources. For example, if the intended driver function to be performed is that of the driver removing his/her foot from the pedal, the corresponding warning may be presented to the driver by utilizing both a visual as well as an audio media source.

Accordingly, for each task, the selected media along with the schedule of the tasks is input to the multi-modal warning coordinator 2140. The multi-modal warning coordinator 2140 coordinates the activation of all media associated with a specific task, and ensures that the respective media remain activated for a time duration corresponding to the warning duration time associated with the task. Further, the multi-modal warning delivery unit 2150 executes the warning instruction by utilizing the activated media sources and presenting the warning to the driver.

By one embodiment, the multi-modal switching warning unit 140 includes the warning effect monitor 2160 that is configured to determine, whether upon presenting a particular warning to the driver, the driver is executing (or has executed) the particular task associated with the warning. For instance, the warning effect monitor 2160 may utilize a plurality of sensors disposed in the vehicle to capture information pertaining to whether the driver has executed the task. For example, considering the task wherein the driver is warned to remove his/her foot from the gas pedal, the warning effect monitor may utilize a sensor (e.g., a displacement sensor) to determine whether he driver has lifted his/her foot from the gas pedal.

By one embodiment, information captured by the plurality of sensors may be input to the warning instruction modifier 2170. The warning instruction modifier 2170 is configured to modify/adjust parameters associated with the warning of the task. For instance, if the warning effect monitor 2160 determines that the driver has not removed his/her foot from the gas pedal, the instruction modifier 2170 may increase a decibel level of an audio source that is used to provide the warning to the driver. Additionally, by one embodiment, the warning instruction modifier 2170 may utilize the multi-modal media models 2130 to incorporate additional sources to be used in re-warning the driver to perform the task. As such, the warning instruction modifier 2170 feeds back the updated instruction to the multi-modal warning instruction parser which repeats execution of the warning instruction. It must be appreciated that upon presenting the warning to the driver to execute the assigned task, the multi-modal switch warning unit 140 monitors the driver to determine whether the task is being executed in a timely manner. If it is observed that the driver does not perform the assigned task within the estimated task duration time, the vehicle may provide a feedback (referring to FIG. 1) to the driving mode switching unit 130 to execute an exception handling process.

Figure 22:
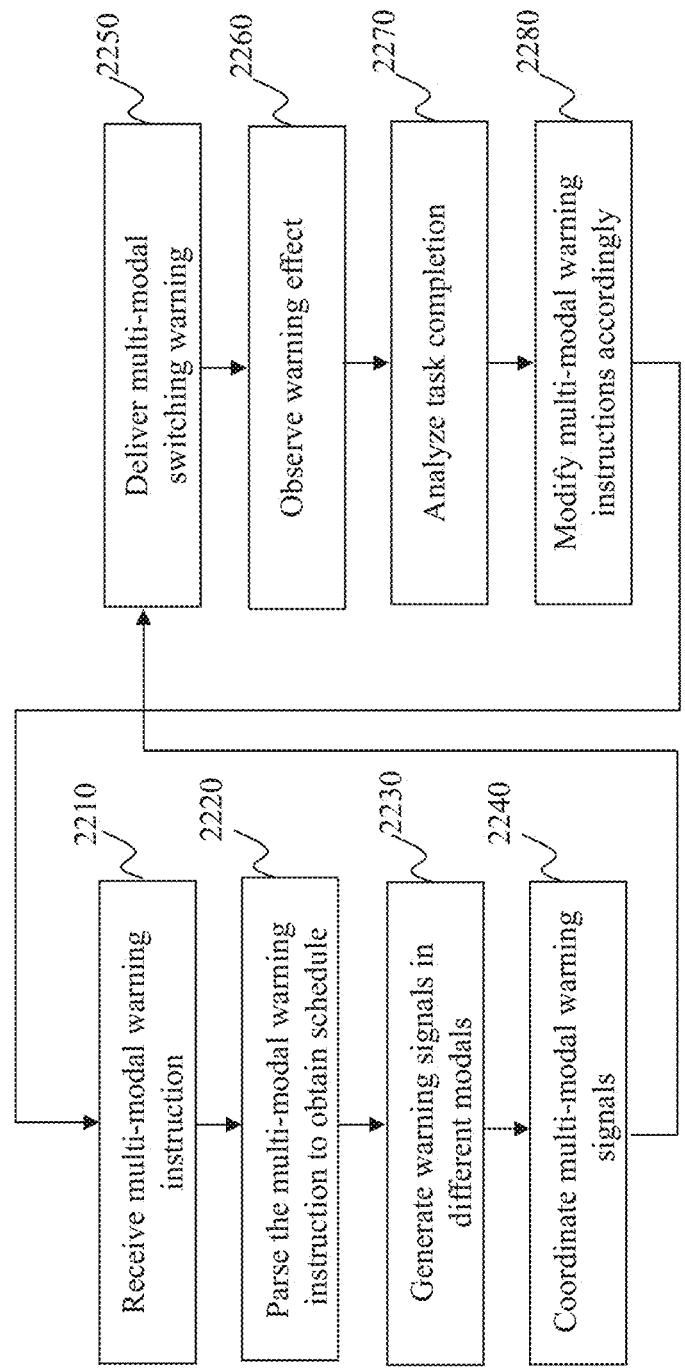
FIG. 22 depicts an illustrative flowchart outlining an exemplary process performed by the multi-modal switching warning unit, according to an embodiment of the present teaching.

Turning to FIG. 22, there is depicted an illustrative flowchart outlining an exemplary process performed by the multi-modal switching warning unit 140.

The process commences in step 2210, wherein the multi-modal switching warning unit 140 receives a multi-modal warning instruction. In step 2220, the multi-modal switching warning unit parses the multi-modal warning to obtain the schedule of tasks associated with each instruction.

The process further proceeds to step 2230, wherein based on the media selected for each task (i.e., selected by the warning media determiner 1970 in FIG. 19), the multi-modal switching warning unit 140 utilizes a time control model to select at least one media generator 2120-1 to 2120-6, which is configured to activate the corresponding media associated with the task. In this manner, a warning signal associated with the task is generated and transmitted to the warning coordinator of the multi-modal switching warning unit 140.

Further, the process in step 2240 utilizes the warning coordinator of the multi-modal switching warning unit 140 to coordinate the activation of all media associated with a specific task. Further, in step 2250, the generated warning is delivered to the driver.

The process then moves to step 2260, wherein the multi-modal switching warning unit observes an effect of the warning. As stated previously, the multi-modal switching warning unit collects information from a plurality of sensors to observe if the warning presented to the user is being followed. Further, the process in step 2270 determines based on the observation of step 2260, whether the scheduled task is completed.

In response to the scheduled task not being completed by the driver, the multi-modal switching warning unit 140 modifies the instruction in step 2280. Specifically, the multi-modal switching warning unit 140 modifies/adjusts parameters associated with the warning of the task. Additionally, the multi-modal switching warning unit 140 may modify a task by associating additional media to warning instruction. In this manner, the modified warning (of step 2280) is feedback to the multi-modal switching warning unit 140 for being re-presented to the driver of the vehicle. Note that if a particular task is not completed within the corresponding task duration time, an exception handling process as described previously may be initiated.

Figure 23:
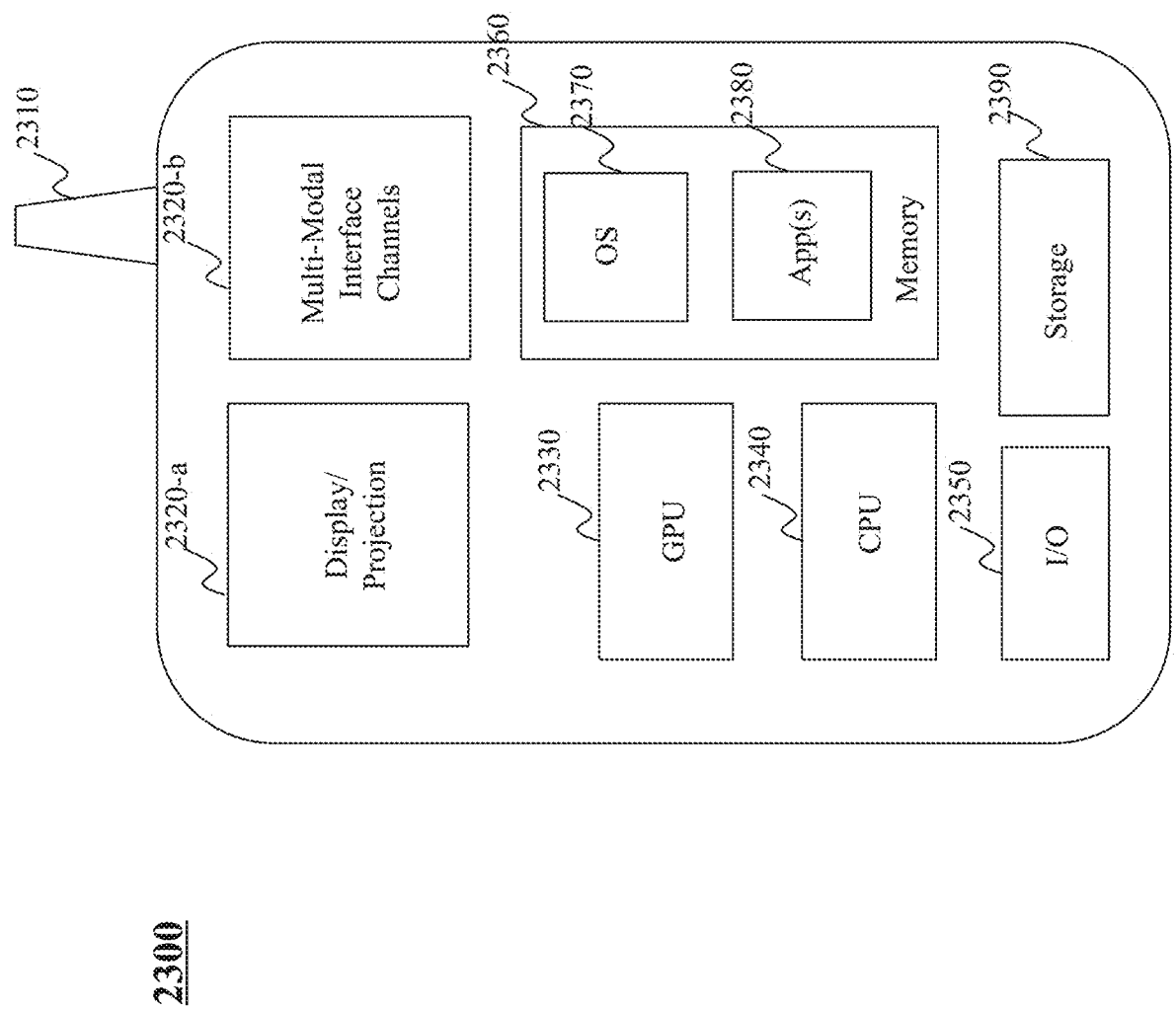
FIG. 23 depicts an architecture of a mobile device which can be used to implement a specialized system incorporating the present teaching.

FIG. 23 depicts the architecture of a mobile device 2300 which can be used to realize a specialized system implementing the present teaching. This mobile device 2300 includes, but is not limited to, a smart phone, a tablet, a music player, a handled gaming console, a global positioning system (GPS) receiver, and a wearable computing device (e.g., eyeglasses, wrist watch, etc.), or in any other form factor. The mobile device 2300 in this example includes one or more central processing units (CPUs) 2340, one or more graphic processing units (GPUs) 2330, a memory 2360, a communication platform 2310, such as a wireless communication module, storage 2390, one or more input/output (I/O) devices 2350, a display or a projection 2320-a for visual based presentation, and one or more multi-modal interface channels 2320-b. The multi-modal channels may include acoustic channel or other media channels for signaling or communication. Any other suitable component, including but not limited to a system bus or a controller (not shown), may also be included in the mobile device 2300. As shown in FIG. 23, a mobile operating system 2370, e.g., iOS, Android, Windows Phone, etc., and one or more applications 2380 may be loaded into the memory 2360 from the storage 2390 in order to be executed by the CPU 2340.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to the present teachings as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 24:
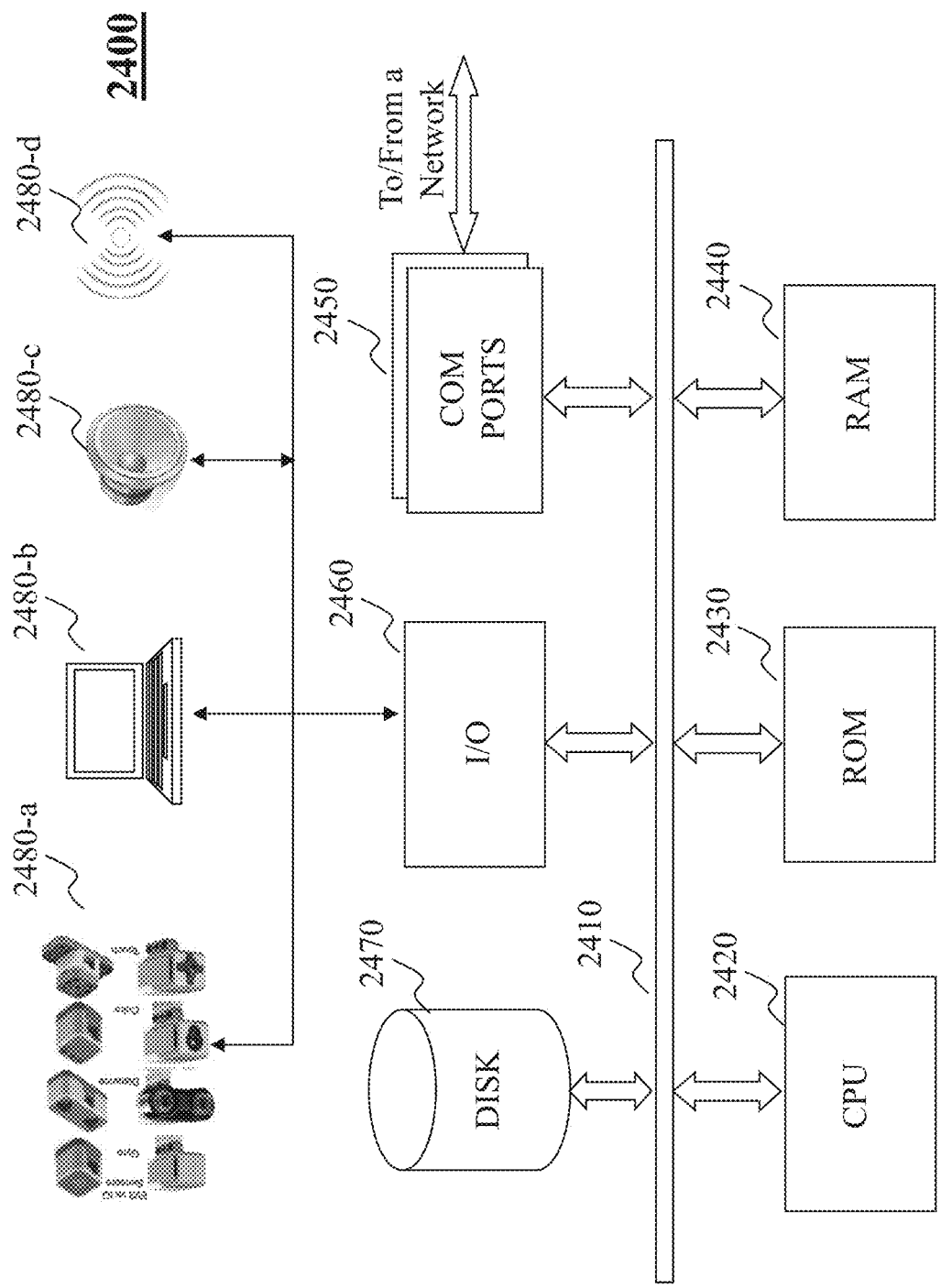
FIG. 24 depicts the architecture of a computer which can be used to implement a specialized system incorporating the present teaching.

FIG. 24 depicts the architecture of a computing device which can be used to realize a specialized system implementing the present teaching. Such a specialized system incorporating the present teaching has a functional block diagram illustration of a hardware platform which includes user interface elements. The computer may be a general-purpose computer or a special purpose computer. Both can be used to implement a specialized system for the present teaching. This computer 2400 may be used to implement any component or aspect of the present teachings, as described herein. Although only one such computer is shown, for convenience, the computer functions relating to the present teachings as described herein may be implemented in a distributed fashion on a number of similar platforms, to distribute the processing load.

The computer 2400, for example, includes COM ports 2450 connected to and from a network connected thereto to facilitate data communications. The computer 2400 also includes a central processing unit (CPU) 2420, in the form of one or more processors, for executing program instructions. The exemplary computer platform includes an internal communication bus 2410, program storage and data storage of different forms, e.g., disk 2470, read only memory (ROM) 2430, or random access memory (RAM) 2440, for various data files to be processed and/or communicated by the computer, as well as possibly program instructions to be executed by the CPU. The computer 2400 also includes an I/O component 2460, supporting input/output flows between the computer and other components therein such as interface elements 2480 in different media forms. An exemplary type of interface element may correspond to different types of sensors 2480-a deployed on the autonomous driving vehicle. Another type of interface element may correspond to a display or a projection 2480-b for visual based communication. There may be additional components for other multi-modal interface channels such as acoustic device 2480-c for audio based communications and/or component 2480-d for signaling based on communication, e.g., signal that causes vibration on a vehicle component such as a car seat. The computer 2400 may also receive programming and data via network communications.

Hence, aspects of the methods of the present teachings, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semi-conductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of a search engine operator or other enhanced ad server into the hardware platform(s) of a computing environment or other system implementing a computing environment or similar functionalities in connection with the present teachings. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the present teachings as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a machine having at least one processor, storage, and a communication platform capable of connecting to a network for switching a vehicle from a current mode to a different mode, the method comprising:

receiving real-time data related to the vehicle and a state of a driver in the vehicle;

determining, based on the real-time data, a set of tasks to be performed to switch the vehicle from the current mode to the different mode in accordance with a task model;

determining, based on a first risk associated with the current mode, a first duration of time required to switch from the current mode to the different mode;

estimating, for each task of the set of tasks, a task duration time needed to complete the task;

estimating a second risk of switching from the current mode to the different mode based on the first duration of time and a total duration of time determined based on the task duration times needed to complete the set of tasks; and switching, in response to the second risk satisfying a criterion, from the current mode of the vehicle to the different mode.

2. The method of claim 1, wherein the real-time data includes intrinsic capability parameters and extrinsic capability parameters, the intrinsic capability parameters specifying conditions internal to the vehicle that limit the operational capability of the vehicle, the extrinsic capability parameters specifying conditions external to the vehicle that limit the operational capability of the vehicle.

3. The method of claim 1, wherein the task duration time for each task of the set of tasks is estimated based on the state of the driver and/or a driver profile.

4. The method of claim 3, wherein the task duration time for each task of the set of tasks is further estimated based on a response-time profile, which includes information corresponding to time required by human drivers to complete the task, and the driver profile is indicative of the task duration time needed by the driver to complete the task.

5. The method of claim 1, wherein the criterion corresponds to the total duration of time needed to complete the set of tasks being less than or equal to the first duration of time.

6. The method of claim 1, further comprising:
generating, prior to the switching, a switch warning instruction in response to the second risk satisfying the criterion, based on the set of tasks to be performed and the task duration time needed to complete each task of the set of tasks.

7. The method of claim 1, wherein the state of the driver
is estimated based on information obtained from a plurality of sensors disposed in the vehicle; and
includes at least one of a pose of the driver, a functional state of the driver, a health state of the driver, and a mental state of the driver.

8. A machine readable medium having information stored thereon for switching a vehicle from a current mode to a different mode, wherein the information, when read by the machine, causes the machine to perform the following:

receiving real-time data related to the vehicle and a state of a driver in the vehicle;

determining, based on the real-time data, a set of tasks to be performed to switch the vehicle from the current mode to the different mode in accordance with a task model;

determining, based on a first risk associated with the current mode, a first duration of time required to switch from the current mode to the different mode;

estimating, for each task of the set of tasks, a task duration time needed to complete the task;

estimating a second risk of switching from the current mode to the different mode based on the first duration of time and a total duration of time determined based on the task duration times needed to complete the set of tasks; and switching, in response to the second risk satisfying a criterion, from the current mode of the vehicle to the different mode.

9. The medium of claim 8, wherein the real-time data includes intrinsic capability parameters and extrinsic capability parameters, the intrinsic capability parameters specifying conditions internal to the vehicle that limit the operational capability of the vehicle, the extrinsic capability parameters specifying conditions external to the vehicle that limit the operational capability of the vehicle.

10. The medium of claim 8, wherein the task duration time for each task of the set of tasks is estimated based on the state of the driver and/or a driver profile.

11. The medium of claim 10, wherein the task duration time for each task of the set of tasks is further estimated based on a response-time profile, which includes information corresponding to time required by human drivers to complete the task, and the driver profile is indicative of the task duration time needed by the driver to complete the task.

12. The medium of claim 8, wherein the criterion corresponds to the total duration of time needed to complete the set of tasks being less than or equal to the first duration of time.

13. The medium of claim 8, wherein the information, when read by the machine further causes the machine to perform:
generating, prior to the switching, a switch warning instruction in response to the second risk satisfying the criterion, based on the set of tasks to be performed and the task duration time needed to complete each task of the set of tasks.

14. The medium of claim 8, wherein the state of the driver
is estimated based on information obtained from a plurality of sensors disposed in the vehicle; and
includes at least one of a pose of the driver, a functional state of the driver, a health state of the driver, and a mental state of the driver.

15. A system for switching a vehicle from a current mode to a different mode, the system comprising:
a switch task estimator configured to:
receive real-time data related to the vehicle and a state of a driver in the vehicle; and
determine, based on the real-time data, a set of tasks to be performed to switch the vehicle from the current mode to the different mode in accordance with a task model;
a response time estimator configured to:
determine, based on a first risk associated with the current mode, a first duration of time required to switch from the current mode to the different mode; and
estimate, for each task of the set of tasks, a task duration time needed to complete the task;
a switching risk estimator configured to:
estimate a second risk of switching from the current mode to the different mode based on the first duration of time and a total duration of time determined based on the task duration times needed to complete the set of tasks; and
switch, in response to the second risk satisfying a criterion, from the current mode of the vehicle to the different mode.

16. The system of claim 15, wherein the real-time data includes intrinsic capability parameters and extrinsic capability parameters, the intrinsic capability parameters specifying conditions internal to the vehicle that limit the operational capability of the vehicle, the extrinsic capability parameters specifying conditions external to the vehicle that limit the operational capability of the vehicle.

17. The system of claim 15, wherein the task duration time for each task of the set of tasks is estimated based on the state of the driver and/or a driver profile.

18. The system of claim 17, wherein the task duration time for each task of the set of tasks is further estimated based on a response-time profile, which includes information corresponding to time required by human drivers to complete the task, and the driver profile is indicative of the task duration time needed by the driver to complete the task.

19. The system of claim 15, wherein the criterion corresponds to the total duration of time needed to complete the set of tasks being less than or equal to the first duration of time.

20. The system of claim 15, further comprising a warning instruction generator configured to:
   generate, prior to the switching, a switch warning instruction in response to the second risk satisfying the criterion, based on the set of tasks to be performed and the task duration time needed to complete each task of the set of tasks.

* * * * *